(12) United States Patent
Ueno et al.

(10) Patent No.: US 9,856,168 B2
(45) Date of Patent: Jan. 2, 2018

(54) MIXING AND STIRRING DEVICE, METHOD, AND METHOD FOR MANUFACTURING LIGHTWEIGHT GYPSUM BOARD, INCLUDING CHUTE WITH ECCENTRIC ORIFICE PASSAGE

(71) Applicant: YOSHINO GYPSUM CO., LTD., Tokyo (JP)

(72) Inventors: Yasutoshi Ueno, Toyohashi (JP); Hitoshi Inenaga, Fukuoka (JP); Yutaka Matsuzaki, Sodegaura (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 323 days.

(21) Appl. No.: 14/647,230

(22) PCT Filed: Nov. 27, 2013

(86) PCT No.: PCT/JP2013/081872
§ 371 (c)(1),
(2) Date: May 26, 2015

(87) PCT Pub. No.: WO2014/087892
PCT Pub. Date: Jun. 12, 2014

(65) Prior Publication Data
US 2015/0315074 A1    Nov. 5, 2015

(30) Foreign Application Priority Data

Dec. 5, 2012    (JP) .................................. 2012-265921

(51) Int. Cl.
*B01F 15/02*    (2006.01)
*B28C 7/16*    (2006.01)
(Continued)

(52) U.S. Cl.
CPC .......... *C04B 11/00* (2013.01); *B01F 7/00766* (2013.01); *B01F 7/26* (2013.01);
(Continued)

(58) Field of Classification Search
CPC .... B01F 15/0266; B01F 7/26; B01F 15/0233; B01F 15/0276; B01F 15/0292;
(Continued)

(56) References Cited

U.S. PATENT DOCUMENTS 4,257,710 A    3/1981 Delcoigne et al.
6,193,408 B1    2/2001 Miura et al.
(Continued)

FOREIGN PATENT DOCUMENTS

CA    1121804    4/1982
JP    54-117972    9/1979
(Continued)

OTHER PUBLICATIONS

Extended European Search Report dated Dec. 12, 2016 in related European Application No. 13859946.9.
(Continued)

*Primary Examiner* — Charles Cooley
(74) *Attorney, Agent, or Firm* — Staas & Halsey LLP

(57) ABSTRACT

Turning motion of gypsum slurry spouting onto a sheet of paper for a gypsum board liner is restricted for preventing maldistribution, deviation or irregular dispersion from occurring in the density distribution of the slurry on the sheet of paper. A mixing and stirring device for gypsum slurry has a circular casing forming a mixing area, a rotary disc positioned in the casing, and a tubular passage for feeding the slurry onto the sheet of paper for the gypsum board liner. A chute has a fluid passage portion with its cross section being non-axisymmetric with respect to a center axis of the tubular passage, or a fluid passage portion varying a position (Continued)

of the center axis of the tubular passage by a change or lateralization of the cross section of fluid passage.

23 Claims, 21 Drawing Sheets

(51) Int. Cl.
| | | |
|---|---|---|
| *C04B 11/00* | (2006.01) | |
| *B28C 5/16* | (2006.01) | |
| *B28C 5/12* | (2006.01) | |
| *B01F 7/00* | (2006.01) | |
| *B28C 5/08* | (2006.01) | |
| *B01F 7/26* | (2006.01) | |

(52) U.S. Cl.
CPC ...... *B01F 15/0233* (2013.01); *B01F 15/0266* (2013.01); *B01F 15/0276* (2013.01); *B01F 15/0292* (2013.01); *B01F 15/0293* (2013.01); *B28C 5/0881* (2013.01); *B28C 5/1253* (2013.01); *B28C 5/16* (2013.01)

(58) Field of Classification Search
CPC .......... B01F 15/0293; B01F 3/12; B01F 5/16; B01F 7/00766; C04B 11/00; B28C 5/0881; B28C 5/1253; B28C 5/16
USPC ........ 366/64, 96–99, 162.1, 6, 8, 18, 20, 35, 366/38, 51, 65, 102, 141, 168.1, 171.1, 366/172.1, 172.2, 181.7, 303–304, 366/315–317; 156/39, 44
See application file for complete search history.

(56) References Cited

U.S. PATENT DOCUMENTS

| | | | | |
|---|---|---|---|---|
| 6,494,609 | B1 | 12/2002 | Wittbold et al. | |
| 6,742,922 | B2* | 6/2004 | Shrader | B01F 5/0646 366/2 |
| 7,690,834 | B2* | 4/2010 | Nakamura | B01F 7/00766 156/39 |
| 8,685,188 | B2* | 4/2014 | Yamaji | B28B 19/0015 156/346 |
| 9,694,332 | B2* | 7/2017 | Brown | B01F 15/0292 |
| 9,700,861 | B2* | 7/2017 | Schenck | B01F 15/0292 |
| 2004/0062141 | A1* | 4/2004 | Shrader | B01F 5/0646 366/155.1 |
| 2006/0045975 | A1* | 3/2006 | Yamaji | B28B 19/0015 427/355 |
| 2007/0008815 | A1* | 1/2007 | Nakamura | B01F 7/00766 366/172.1 |
| 2008/0197516 | A1 | 8/2008 | Abe et al. | |
| 2015/0315074 | A1* | 11/2015 | Ueno | B28C 5/16 106/680 |
| 2016/0121287 | A1* | 5/2016 | Brown | B28C 7/16 366/192 |
| 2017/0008192 | A1* | 1/2017 | Kawamura | B01F 7/00766 |
| 2017/0065950 | A1* | 3/2017 | Schenck | B01F 15/0292 |

FOREIGN PATENT DOCUMENTS

| | | | |
|---|---|---|---|
| JP | 8-196890 | * | 8/1996 |
| JP | 2001-300933 | | 10/2001 |
| JP | 2009-247950 | | 10/2009 |
| WO | WO00/56435 | | 9/2000 |
| WO | WO2004/026550 | | 4/2004 |
| WO | WO2004/103663 | | 12/2004 |

OTHER PUBLICATIONS

English Translation of International Preliminary Report on Patentability, report completed on Oct. 28, 2014 in related International Application No. PCT/JP2013/081872.
International Search Report dated Feb. 10, 2014 in related International Application No. PCT/JP2013/081872.

* cited by examiner

FIG. 8
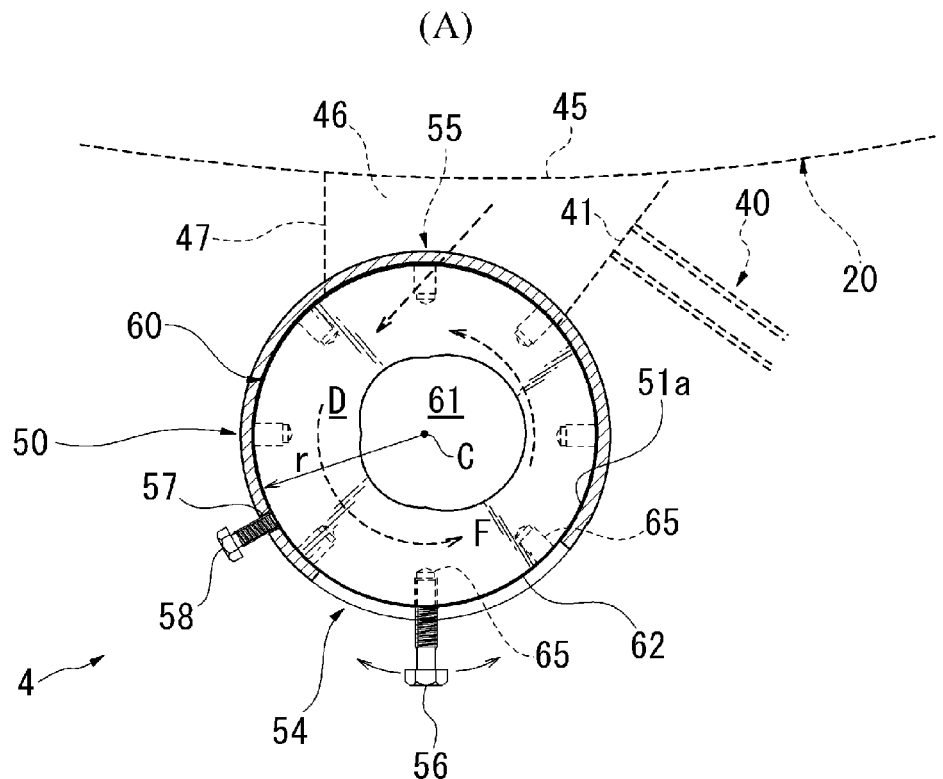
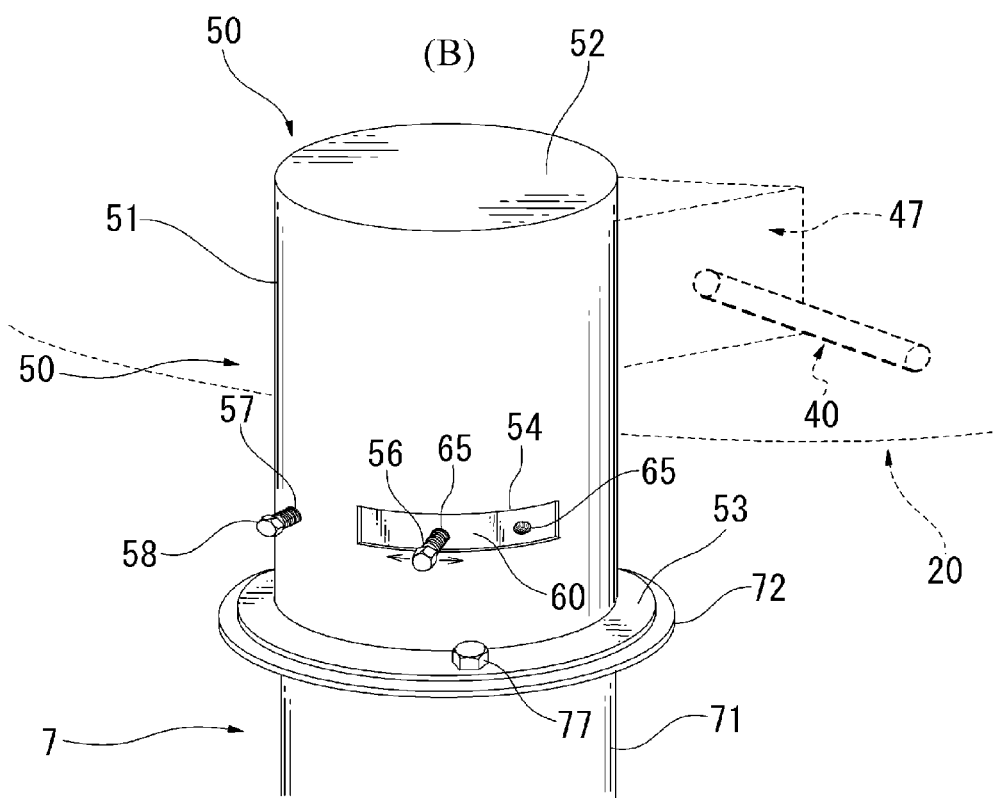

[FIG. 10]

Comparative Example

Comparative Example

FIG. 14
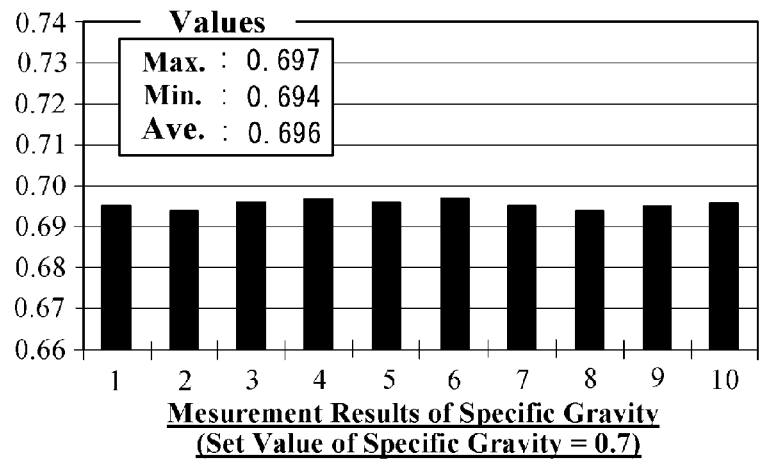
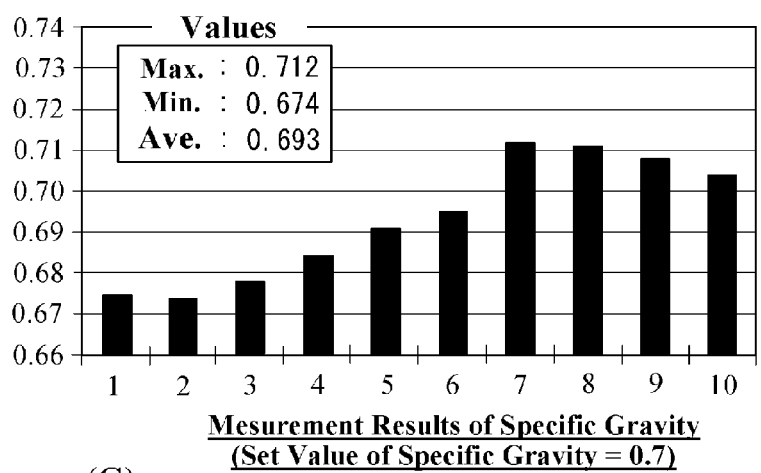
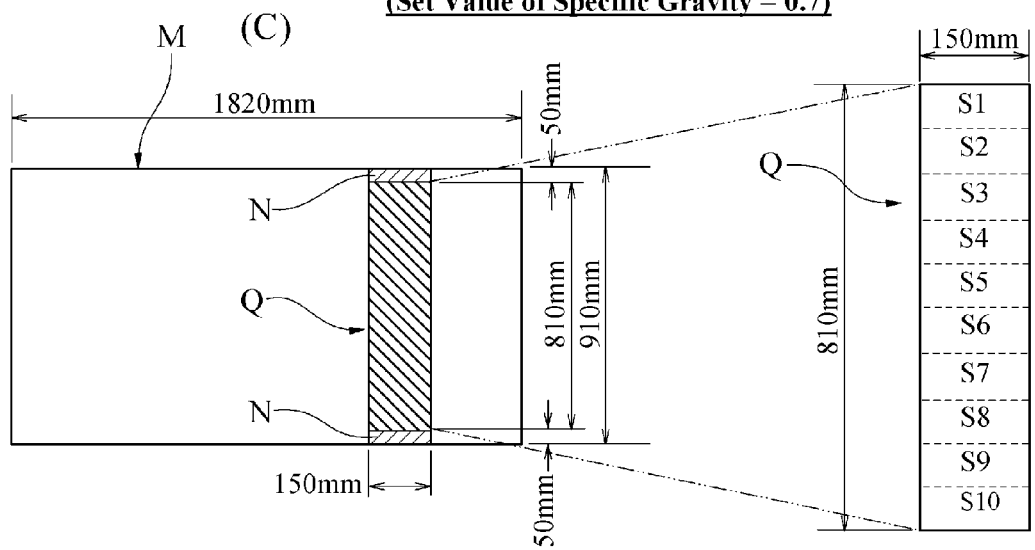

FIG. 15
(A)
Example (Embodiment)
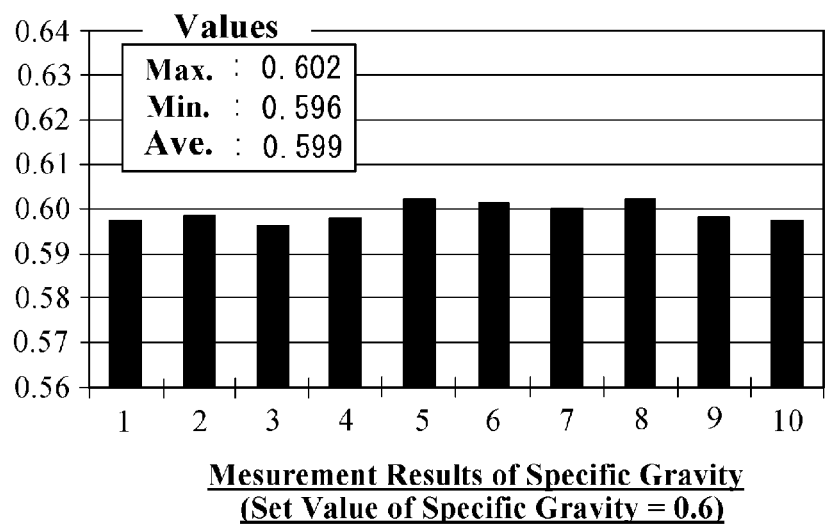
(B)
Comparative Example
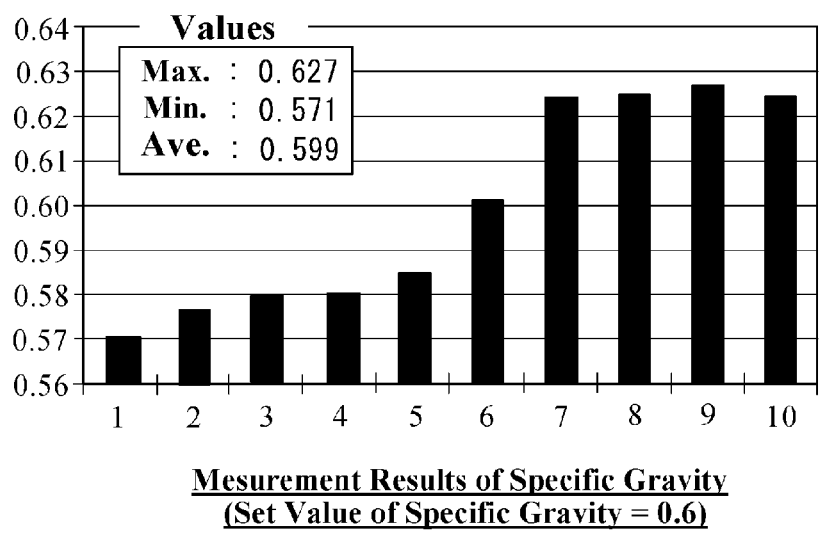

FIG. 16
(A)
Example (Embodiment)
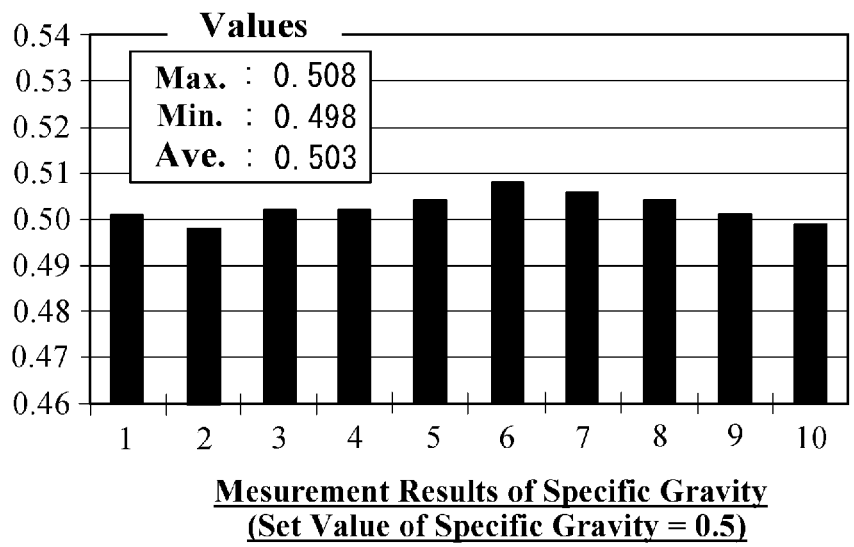
Mesurement Results of Specific Gravity
(Set Value of Specific Gravity = 0.5)
(B)
Comparative Example
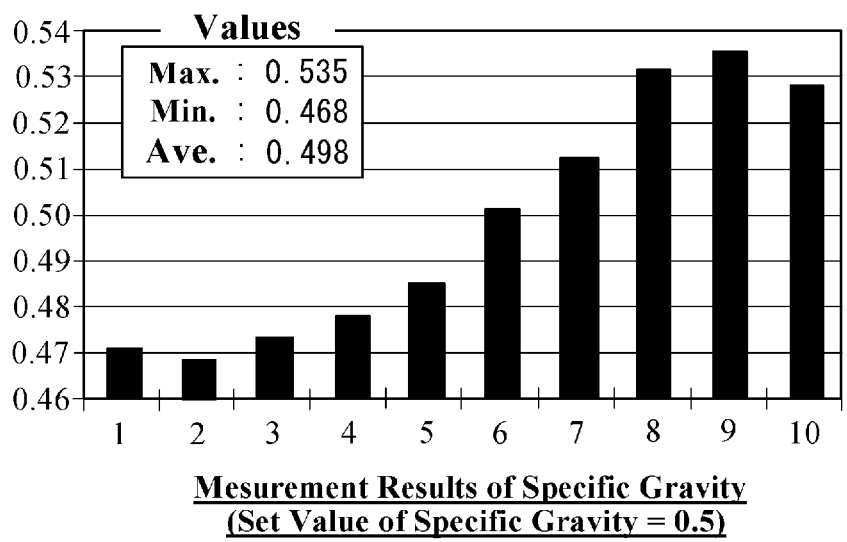
Mesurement Results of Specific Gravity
(Set Value of Specific Gravity = 0.5)

FIG. 17
(A)
Example (Embodiment)
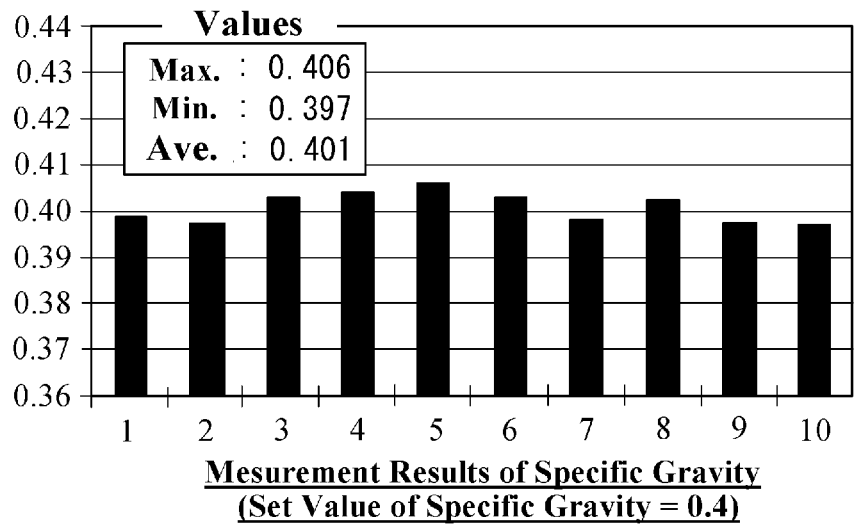
Mesurement Results of Specific Gravity
(Set Value of Specific Gravity = 0.4)
(B)
Comparative Example
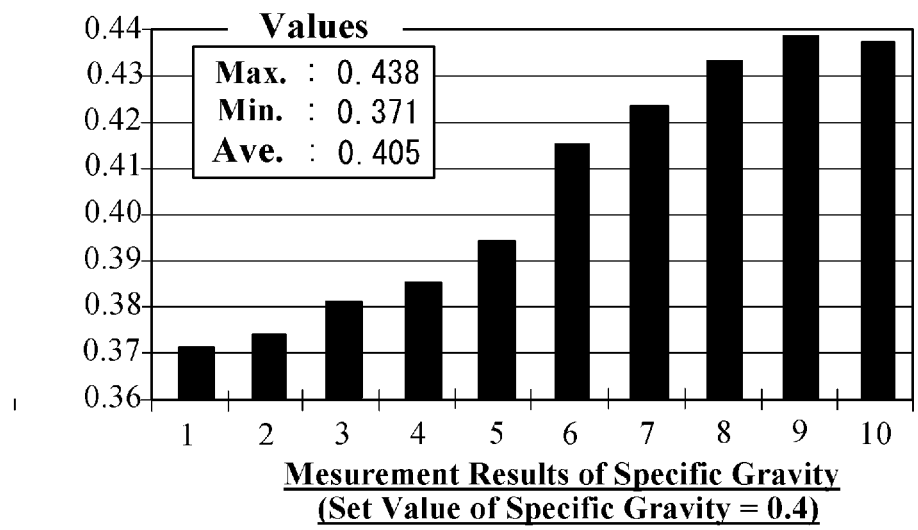
Mesurement Results of Specific Gravity
(Set Value of Specific Gravity = 0.4)

FIG. 20
(A)
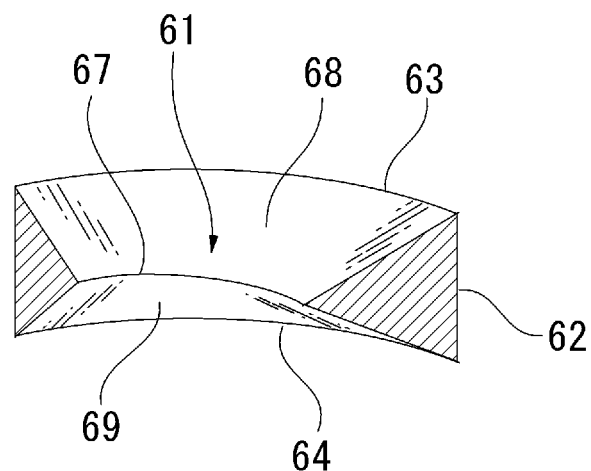
(B)
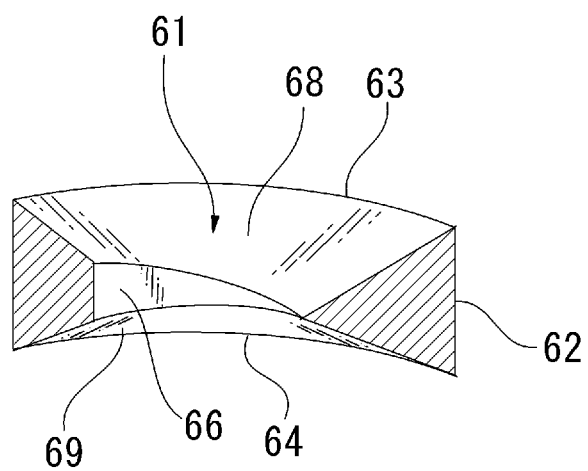

MIXING AND STIRRING DEVICE, METHOD, AND METHOD FOR MANUFACTURING LIGHTWEIGHT GYPSUM BOARD, INCLUDING CHUTE WITH ECCENTRIC ORIFICE PASSAGE

CROSS-REFERENCE TO RELATED APPLICATIONS

This application is a U.S. national stage application of PCT/JP2013/081872 filed Nov. 27, 2013 and claims the foreign priority benefit of Japanese Application No. 2012-265921 filed Dec. 5, 2012, in the Japanese Intellectual Property Office, the contents of all of which are incorporated herein by reference.

TECHNICAL FIELD

The present invention relates to a mixing and stirring device, a mixing and stirring method, and a method for manufacturing lightweight gypsum board, and more specifically, such device and methods which can control or restrict a turning motion of gypsum slurry spouting onto a sheet of paper for a gypsum board liner so as to attain uniformity of a density distribution of the gypsum slurry on the sheet.

BACKGROUND ART

Gypsum boards are known as boards having a gypsum core covered with sheets of paper for gypsum board liner, and are widely used in various kinds of buildings as architectural interior finish materials, because of their advantageous fire-resisting or fire-protecting ability, sound insulation performance, workability, cost performance and so on. In general, the gypsum boards are produced by a continuous slurry pouring and casting process. This process comprises a mixing and stirring step of admixing calcined gypsum, adhesive auxiliary agent, set accelerator, foam (or foaming agent) and so forth with mixing water in a mixing and stirring device; a forming step of pouring calcined gypsum slurry prepared in the device (referred to as "slurry" hereinafter) into an area between upper and lower sheets of paper for gypsum board liner and forming them in a continuous belt-like formation; and a drying and cutting step of roughly severing the solidified continuous belt-like layered formation, drying it forcibly and thereafter, cutting it to be a product size.

Usually, a thin type of circular centrifugal mixer is used as the mixing and stirring device for preparing the slurry. This type of mixer comprises a flattened circular casing and a rotary disc rotatably positioned in the casing. A plurality of material feeding ports for feeding the above materials into the mixer are disposed in a center region of a top cover or an upper plate of the casing, and a slurry outlet port for delivering mixture (slurry) from the mixer is provided in a periphery of the casing or a lower plate (bottom cover) thereof. Typically, a rotary shaft is connected to the disc for rotating the disc, and the shaft is connected with rotary drive means. The upper plate of the casing is equipped with a plurality of upper pins (stationary pins) depending therefrom down to the vicinity of the disc. The disc is equipped with lower pins (movable pins) which are vertically fixed on the disc and which extend up to the vicinity of the upper plate. The upper and lower pins are arranged in radially alternate positions. The ingredients to be mixed are supplied on the disc through the respective feeding ports, and are stirred and mixed while being moved radially outward on the disc under an action of centrifugal force, and then, delivered out of the mixer through the slurry outlet port, which are positioned on the periphery or the lower plate (bottom cover). The mixer with this arrangement is called a pin type of mixer, which is disclosed in, e.g., International Publication of PCT Application No. WO00/56435 (Patent Literature 1).

As regards a method for delivering the slurry prepared in the mixer to the outside of the mixer, the following three kinds of methods are mainly known in the art:

(1) A vertical chute, which is also called as "canister", is attached to a slurry outlet port provided on an annular wall of the casing, and the slurry on the rotary disc is delivered into the chute under the action of centrifugal force, so that the slurry flowing into the chute is gravitationally spouted onto the sheet of paper (International Publication of PCT Application No. WO2004/026550 (Patent Literature 2));

(2) A tubular passage for transporting the slurry is transversely connected to the slurry outlet port provided on the annular wall of the casing, so that the slurry is spouted onto the sheet of paper with use of a delivery pressure of the mixer (U.S. Patent Publication No. 6,494,609 (Patent Literature 3));

(3) A slurry delivery tubular passage is vertically connected to the slurry outlet port provided on the lower plate of the casing, so that the slurry is gravitationally spouted onto the sheet of paper through the delivery passage (Japanese Patent Laid-Open Publication No. 2001-300933 (Patent Literature 4)).

In general, foam or foaming agent is fed to the slurry in the mixer, in order to regulate or adjust the specific gravity of gypsum board. Proper mixing of the foam or foaming agent in the slurry is considered to be an essential matter in a method for producing lightweight gypsum boards. Therefore, in the method for producing gypsum boards in recent years, a technique for properly mixing an appropriate quantity of foam or foaming agent with the slurry is considered to be especially important. As regards reduction in a supply amount of foam or foaming agent (referred to as "amount of foam" hereinafter) and uniform mixing of the slurry and the foam, it is considered that a relation is very important between a method for feeding the foam or foaming agent to the slurry and a method for delivering the slurry (Patent Literatures 2 and 3).

Each of U.S. Patent Publication No. 6,742,922 (Patent Literature 5) and International Publication of PCT Application No. WO2004/103663 (Patent Literature 6)) discloses a technique intended to attain homogeneous dispersion and distribution of the foam or foaming agent in the slurry with use of a slurry swirling flow in a vertical chute.

A circular fluid passage in the vertical chute is provided with an orifice member in a lower part of the passage, as regards the mixer intended for homogeneous dispersion and distribution of the foam in the slurry by means of a slurry swirling flow generated in the chute. The orifice member has an orifice or constriction (referred to as "orifice" hereinafter). The orifice acts as a fluid resistance against a vertical movement of the slurry, so that the slurry flowing in the chute does not immediately flow down through the chute gravitationally, and therefore, the intratubular swirling flow of slurry is surely created in an intratubular area of the chute.

CITATION LIST

Patent Literatures

[Patent Literature 1] International Publication of PCT Application No. WO00/56435

[Patent Literature 2] International Publication of PCT Application No. WO2004/026550
[Patent Literature 3] U.S. Patent Publication No. 6,494,609
[Patent Literature 4] Japanese Patent Laid-Open Publication No. 2001-300933
[Patent Literature 5] U.S. Patent Publication No. 6,742,922
[Patent Literature 6] International Publication of PCT Application No. WO2004/103663

SUMMARY OF INVENTION

Technical Problem

The orifice of the aforementioned orifice member is constituted from a horizontal opening in a form of perfect circle, a center of which is coincide with a center axis of the chute. As described in the Patent Literature 5, the swirling flow of slurry generated in an upper area above the orifice is temporarily reduced in its radius of swirling motion and increased in its fluid velocity at the orifice, and then, on a downstream side of the orifice, the flow of slurry is increased in its radius of swirling motion and reduced in its fluid velocity, so that the radius and velocity of the swirling flow before entering the orifice is almost retrieved or regenerated. A turbulent flow is locally generated in the orifice section by such change in radius and velocity of the flow, whereby mixing of the slurry and foam is promoted.

However, in experiments carried out by the present inventors, it has been recognized that, in measurement of the specific gravity of the slurry spouted from the chute onto the sheet of paper for gypsum board liner, a relatively significant maldistribution, deviation or irregular dispersion occurs in a density distribution of slurry taken along a widthwise direction of the sheet of paper, as shown in comparative examples of FIGS. 14-17. Further, according to the experiments of the present inventors, such deviation or irregular dispersion is more significantly observed when the amount of foam is increased for reducing the weight of gypsum board. Therefore, in a case where the lightweight gypsum boards are to be produced, it is particularly important to surely prevent such maldistribution, deviation or irregular dispersion from occurring in the distribution of the specific gravity.

Further, the technique as disclosed in the Patent Literatures 5 and 6 is so arranged as to promote the mixing of the slurry and the foam with use of the swirling flow generated in an intratubular area of the chute having a vertical center axis. A similar phenomenon is observed also in a slurry transporting tubular passage transversely connected to the slurry outlet port on the annular wall of the casing (Patent Literature 3), or a slurry delivery tubular passage vertically connected to the slurry outlet port of the lower plate of the casing (Patent Literature 4)), wherein the turning flow occurs at the slurry discharge port of the tubular passage when the slurry spouts onto the sheet of paper. This is considered to be caused by effects of rotating motion of the slurry in the internal mixing area of the mixer, an axisymmetric vortex flow generated as an intratubular swirling flow of slurry in an intratubular area of the tubular passage, and so forth.

It is an object of the present invention to provide a mixing and stirring device, a mixing and stirring method, and a method for manufacturing lightweight gypsum board, which can restrict the turning motion of gypsum slurry spouting onto the sheet of paper for a gypsum board liner, thereby preventing the maldistribution, deviation or irregular dispersion from occurring in the distribution of the specific gravity of slurry on the sheet of paper.

Solution to Problem

The present invention provides a mixing and stirring device for gypsum slurry, which has a circular casing forming a mixing area for mixing of the gypsum slurry, a rotary disc positioned in the casing and rotated in a predetermined rotational direction, and a tubular passage for delivery of the gypsum slurry provided outside of the casing in order to feed the slurry of the mixing area onto a sheet of paper for gypsum board liner, wherein said tubular passage includes a fluid passage portion having its cross section non-axisymmetric with respect to a center axis of the tubular passage, for breaking down an axisymmetric vortex flow of the gypsum slurry generated in the tubular passage as an intratubular swirling flow, or a fluid passage portion varying a position of the center axis of the tubular passage by change or lateralization of the cross section of fluid passage, for causing breakdown action of said axisymmetric vortex flow.

The present invention also provides a method for mixing and stirring gypsum slurry, with use of a mixing and stirring device for the gypsum slurry having a circular casing forming a mixing area for mixing of the gypsum slurry, a rotary disc positioned in the casing and rotated in a predetermined rotational direction, and a tubular passage for delivery of the gypsum slurry provided outside of the casing in order to feed the slurry of the mixing area to a sheet of paper for gypsum board liner, comprising steps of:

forming a fluid passage portion of the tubular passage which has its cross section non-axisymmetric with respect to a center axis of said tubular passage, or a fluid passage portion of the tubular passage which changes a position of the center axis of the tubular passage by change or lateralization of the cross section of fluid passage; and breaking down an axisymmetric vortex flow, which is generated in said tubular passage as an intratubular swirling flow, by change of the cross-section and/or a center of fluid passage, thereby restricting regeneration or generation of the intratubular swirling flow in an intratubular area of a discharge pipe portion of said tubular passage located on a downstream side of the fluid passage portion.

In the present inventors' understanding, ununiformity, instability and the like with respect to the density distribution of slurry spouting onto the sheet of paper result from a phenomenon in that ingredients of the mixture having relatively high specific gravities are biased to an outer portion of the swirling flow and ingredients of the mixture having relatively low specific gravities are biased to an inner portion of the swirling flow, owing to the intratubular swirling flow generated in the tubular passage for feeding the slurry. Therefore, in a case where the slurry includes a relatively large amount of foam or foaming agent which has a relatively low specific gravity, the phenomenon of ununiformity or instability is significantly observed. According to the present invention, an axisymmetric vortex flow generated as the intratubular swirling flow in the slurry feeding tubular passage is broken down at least partially by means of the non-axisymmetric cross-section of fluid passage or the change or lateralization of the cross section of fluid passage for changing the position of the center of the tubular passage, whereby the slurry flow is considerably disturbed at such a fluid passage portion. Thus, the intratubular swirling flow after passing through this fluid passage portion does not regenerate its condition before entering this passage portion, or the swirling flow is difficult to be generated on the downstream side of the fluid passage portion. The swirling motion almost disappears on the downstream side of the fluid passage portion, and the swirling motion, which may possibly cause the ununiformity or instability of the distribution of the specific gravity, does not remain in the slurry which spouts from the discharge pipe portion onto the sheet of paper. According to the experiments of the present inventors, in a case where the slurry restricted in its swirling motion is spouted onto the sheet of paper, the distribution of the specific gravity is uniform and stable even in a case where the slurry includes a relatively large amount of foam or foaming agent, and therefore, the aforementioned problem of ununiformity or instability of the density distribution can be overcome.

The term reading "breakdown" does not always mean complete breakdown of the axisymmetric vortex flow, but it means that the axisymmetric vortex flow is at least partially broken down to the extent that the intratubular swirling flow is prevented from being regenerated or caused in the discharge pipe portion discharging or spouting the slurry onto the sheet of paper. Further, the term reading "cross section of fluid passage" means a cross section perpendicular to a direction of flow of the gypsum slurry.

From another aspect of the invention, the present invention provides a method for manufacturing lightweight gypsum boards having a specific gravity equal to or less than 0.8, wherein gypsum slurry is produced with use of a mixing and stirring device for the gypsum slurry, which has a circular casing forming a mixing area for mixing of the gypsum slurry, a rotary disc positioned in the casing and rotated in a predetermined rotational direction, and a tubular passage for delivery of the gypsum slurry provided outside of the casing in order to feed the slurry of the mixing area to a sheet of paper for gypsum board liner, and wherein the slurry of the mixing area is spouted onto said sheet of paper, comprising steps of:

introducing said gypsum slurry of the mixing area effluent from the casing through a slurry outlet port disposed on the casing, into said tubular passage together with foam or foaming agent for adjustment of a specific gravity, and generating an intratubular swirling flow in an intratubular area of the tubular passage by turning the slurry therein so that the slurry and the foam or foaming agent are mixed in the tubular passage by the swirling flow generated in the tubular passage; and forming a fluid passage portion of said tubular passage, which has a cross-section of fluid passage non-axisymmetric with respect to a center axis of the tubular passage, or which changes the center axis of the tubular passage by change or lateralization of the cross section of fluid passage, and causing an axisymmetric vortex flow breakdown action of the intratubular swirling flow generated in said tubular passage, owing to change in the cross section of fluid passage and/or a center thereof, thereby restricting regeneration or generation of the intratubular swirling flow in a discharge pipe portion of said tubular passage located on a downstream side of said fluid passage portion.

Preferably, the tubular passage is provided with an orifice passage which has the cross section of fluid passage non-axisymmetric with respect to the center axis of the intratubular area and which locally constricts the cross section of fluid passage, and the axisymmetric vortex in the intratubular area is broken down at the orifice passage to restrict the regeneration or generation of the intratubular swirling flow in the discharge pipe portion of the tubular passage located on a downstream side of the orifice passage.

According to the above arrangement of the present invention, the slurry and the foam or foaming agent are mixed by the intratubular swirling flow generated in the tubular passage, and the foam or foaming agent in the slurry is apt to be biased radially inward of the swirling flow. However, such inward biasing of the foam or foaming agent is prevented from occurring, owing to breakdown of the axisymmetric vortex flow caused when the fluid flows through the aforementioned fluid passage portion or the orifice passage. Since the fluid passage portion or the orifice passage restricts regeneration or generation of the intratubular swirling flow in the discharge pipe portion on the downstream side thereof, the slurry is spouted onto the sheet of paper from the discharge pipe portion in a condition that the foam or foaming agent is uniformly dispersed in the slurry. The present inventors recognized in the experiments that the maldistribution, deviation or irregular dispersion could be prevented from occurring in the distribution of the specific gravity, even when the specific gravity of the gypsum core of the gypsum board was considerably decreased (for example, in a case where the mixing proportion of materials and production condition corresponding to the specific gravity of 0.4 were employed), as shown in the examples of FIGS. 14-17.

Advantageous Effects of Invention

According to the present invention, a mixing and stirring device, a mixing and stirring method, and a method for manufacturing lightweight gypsum board can be provided, which can restrict the turning motion of gypsum slurry spouting onto the sheet of paper for a gypsum board liner, thereby preventing the maldistribution, deviation or irregular dispersion from occurring in the distribution of the specific gravity of slurry on the sheet of paper.

BRIEF DESCRIPTION OF THE DRAWINGS

FIG. 8 includes a transverse cross-sectional view and a perspective view of a vertical chute.

FIG. 14 includes graphic diagrams showing measurement results of distributions of specific gravities with respect to gypsum cores, wherein a target value of the specific gravity of the core is 0.7.

FIG. 15 includes graphic diagrams showing the measurement results of the distributions of the specific gravities with respect to gypsum cores, wherein the target value of the specific gravity of the core is 0.6.

FIG. 16 includes graphic diagrams showing the measurement results of the distributions of the specific gravities with respect to gypsum cores, wherein the target value of the specific gravity of the core is 0.5.

FIG. 17 includes graphic diagrams showing the measurement results of the distributions of the specific gravities with respect to gypsum cores, wherein the target value of the specific gravity of the core is 0.4.

FIG. 20 includes partial perspective views of the orifice members, which show configurations of edge portions of the openings.

DESCRIPTION OF EMBODIMENTS

Figure 1:
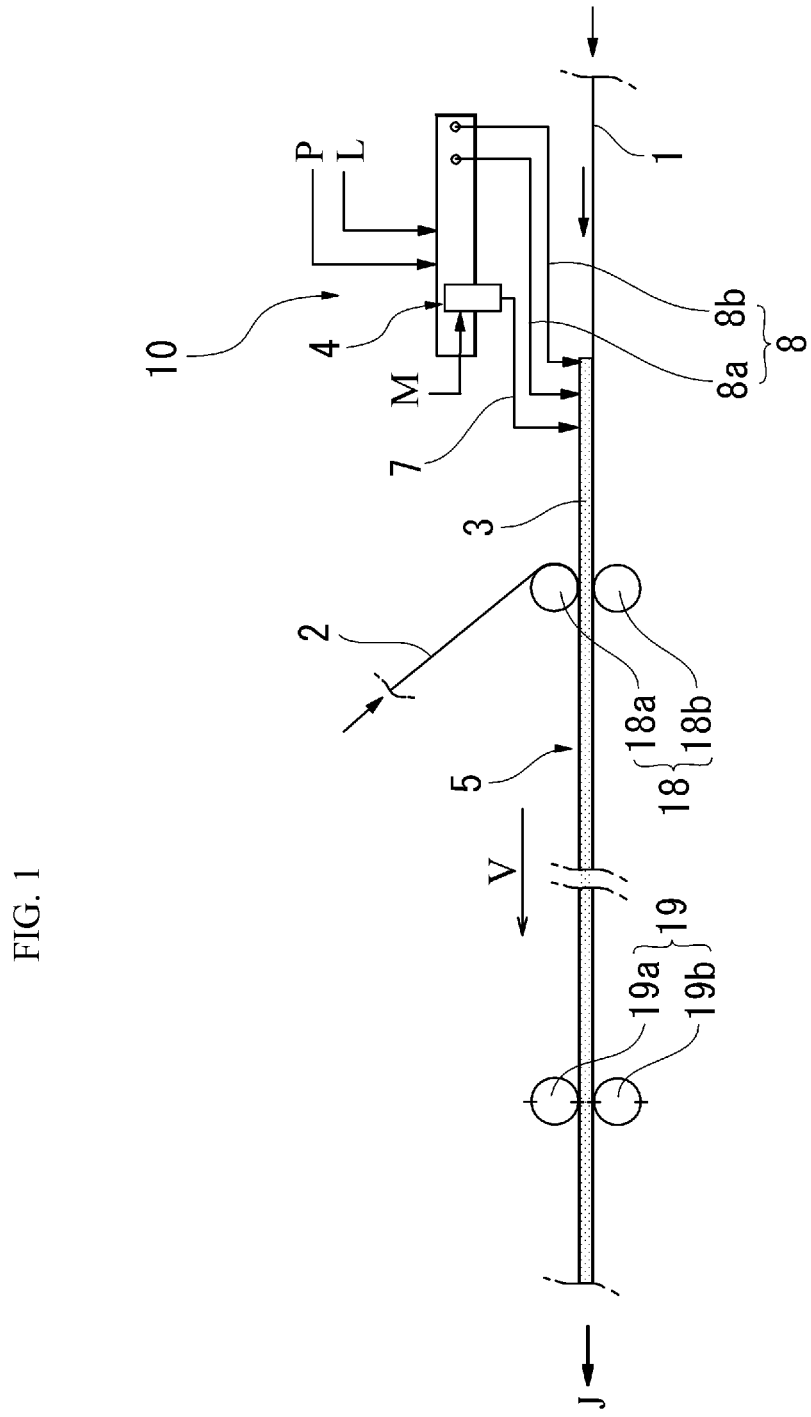
FIG. 1 is an explanatory process diagram partially and schematically illustrating a forming process of gypsum boards.

In a preferred embodiment of the present invention, the fluid passage portion is the orifice passage locally constricting the cross section of fluid passage, and the orifice passage has a centroid of its cross section located at a position eccentric to the center axis of the tubular passage. Preferably, the contour of the cross section of the orifice passage is a single figure or a composite figure constituted from a plurality of figures partially superimposed with each other. The centroid of the figure or composite figure is eccentric to the center axis of the tubular passage. For instance, the composite figure is constituted from a plurality of circles (perfect circle, ellipse, elongated circle, and so forth) having different diameters and/or different center positions, which are superimposed with each other only partially (the composite figure does not include the figures having the same center position and completely overlapped, or two circles having one circle completely enclosed in the other circle, and so on).

In the present invention, an eccentric ratio "$\eta = \Delta E/r$" of the centroid is preferably set in a range equal to or greater than 0.06 (6%), wherein the eccentricity ratio "$\eta$" of the centroid is defined to be "$\Delta E/r$", "$\Delta E$" is a distance between the centroid and the center axis of the tubular passage, and "$r$" is the radius of the tubular passage. If desired, the eccentricity ratio "$\eta$" can be set to be equal to or greater than 0.10 (10%). The eccentricity ratio "$\eta'$" of the centroid may be defined to be "$\Delta E/Rmax$", wherein "$Rmax$" is a maximum value of a distance from the center axis of the tubular passage to the contour of the figure. In such a case, the eccentricity ratio "$\eta'$" is preferably set to be equal to or greater than 0.10 (10%), and if desired, the eccentricity ratio "$\eta'$" can be set to be equal to or greater than 0.15 (15%). According to the experiments of the present inventors, such eccentricities of the orifice passage do not obstacle creation of the swirling flow on the upstream side of the orifice passage.

According to a preferred embodiment of the present invention, materials for gypsum boards including calcined gypsum, mixing water, and additives and admixtures (such as adhesive agent, set accelerator and so on) are fed into the mixing and stirring device. These ingredients are mixed with each other, while moving radially outward on the disc under the action of centrifugal force, and reaches a peripheral zone (slurry retention area) of the device, as the slurry substantially completely mixed. For instance, the outlet port is positioned on an annular wall of the circular casing so as to be subjected to the centrifugal force of the device. The specific gravity of the gypsum slurry depends on an amount of inclusion of foam, if the factor of amount of mixing water is not taken into consideration. Preferably, a foam feeding port, which feeds the foam or foaming agent to the slurry for adjustment of the specific gravity of gypsum core, is located on the annular wall so as to feed the foam or foaming agent to the slurry immediately before the slurry flows into the slurry outlet port from the mixing area; or the foam feeding port is located in a slurry delivery section so as to feed the foam or foaming agent to the slurry immediately after the slurry flows through the slurry outlet port from the mixing area. That is, the foam mixed in the slurry may be lost by defoaming action or foam destructing action owing to agitation impact of the mixing and stirring device, but the required amount of foam or foaming agent can be remarkably reduced by feeding the foam or foaming agent to the slurry at the final stage of preparation of the slurry, since the foam or foaming agent is not influenced by the agitation impact (therefore, the foam is efficiently mixed in the slurry).

Preferably, the tubular passage includes a chute which receives the gypsum slurry effluent from the casing through the slurry outlet port of the casing. The chute forms the axisymmetric vortex flow around its vertical center axis in its intratubular area. The outlet part (lower part) of the chute is connected with a discharge pipe portion which spouts the gypsum slurry onto the sheet of paper. The slurry generates the intratubular swirling flow in the tubular passage or the chute, in relation with variation in the cross section of the fluid passage, the direction of fluid flow, the fluid velocity and so forth, when the slurry flows through the slurry outlet ports from the mixing area, when the slurry flows in the intratubular area between the slurry outlet port and the chute, or when the slurry enters the chute. As the results, the axisymmetric vortex flow is formed in the intratubular area of the chute around its vertically extending center axis. The orifice passage is positioned in the lower area of the chute so as to break down the axisymmetric vortex flow which gravitationally moves downward in the intratubular area. In such an arrangement, the slurry and the foam or foaming agent can be mixed in the intratubular area of the chute by the swirling flow in the chute, and the swirling flow gravitationally moving downward therein is broken down by the orifice passage, so as to prevent the swirling flow from being regenerated or generated in the discharge pipe portion on the downstream side or lower side of the orifice passage. This results in uniformity of the specific gravity of the slurry spouting onto the sheet of paper. In one embodiment of the present invention, the slurry outlet port is located on the annular wall or peripheral wall of the casing, or the lower plate or bottom cover of the casing, and the upper part of the chute is in communication with the slurry outlet port by means of a tubular body, such as a resin tube. Further, if desired, the center axis of the chute may be inclined with respect to the vertical direction.

According to a preferred embodiment of the method for manufacturing lightweight gypsum boards, the foam or foaming agent is supplied to the slurry immediately before or immediately after the slurry flows through the slurry outlet port from the mixing area, and the amount of foam or foaming agent fed to the slurry is set to be the amount for producing the gypsum core of the gypsum board having a specific gravity in a range from 0.4 to 0.7.

Preferably, the orifice member with the orifice passage is located in the tubular passage, and the orifice member has adjusting means for adjusting the cross section of fluid passage, which rotates or moves the orifice member to adjust or control the intensity of the axisymmetric vortex breakdown action of the orifice passage. In such adjusting means, adjustment of the intensity of the action can be effected by adjustment or setting of the cross section of the orifice passage. In the mixing and stirring device having such orifice passage and its adjusting means, the action of the orifice passage can be finely adjusted or varied by the adjusting means, while the state or physical property of slurry fed to the sheet of paper is observed or measured during operation of the device. This is very advantageous in practice. In the experiments of the present inventors as described later, the condition or physical property of the slurry fed to the sheet could be changed, when the orifice member was rotated around the center axis of the tubular passage by at least 3 (three) degrees. That is, it has been found by the experiments of the present inventors that intensity of the axisymmetric vortex breaking action can be variably controlled or adjusted by rotation of the orifice member through an angle of at least 3 degrees.

In another embodiment of the present invention, the tubular passage is a slurry transporting tubular passage which is connected to the slurry outlet port on the annular wall of the casing and transversely extends therefrom, or a slurry delivery tubular passage which is connected to the slurry outlet port of the lower plate of the casing and depends therefrom. Downstream ends of these passages constitute the slurry discharge pipe portions spouting the slurry on to the sheet. The orifice passage is provided in the tubular passage to break down the axisymmetric vortex flow generated as the intratubular swirling flow in the passage.

Embodiment

With reference to the attached drawings, preferred embodiments of the present invention are described hereinafter.

Figure 2:
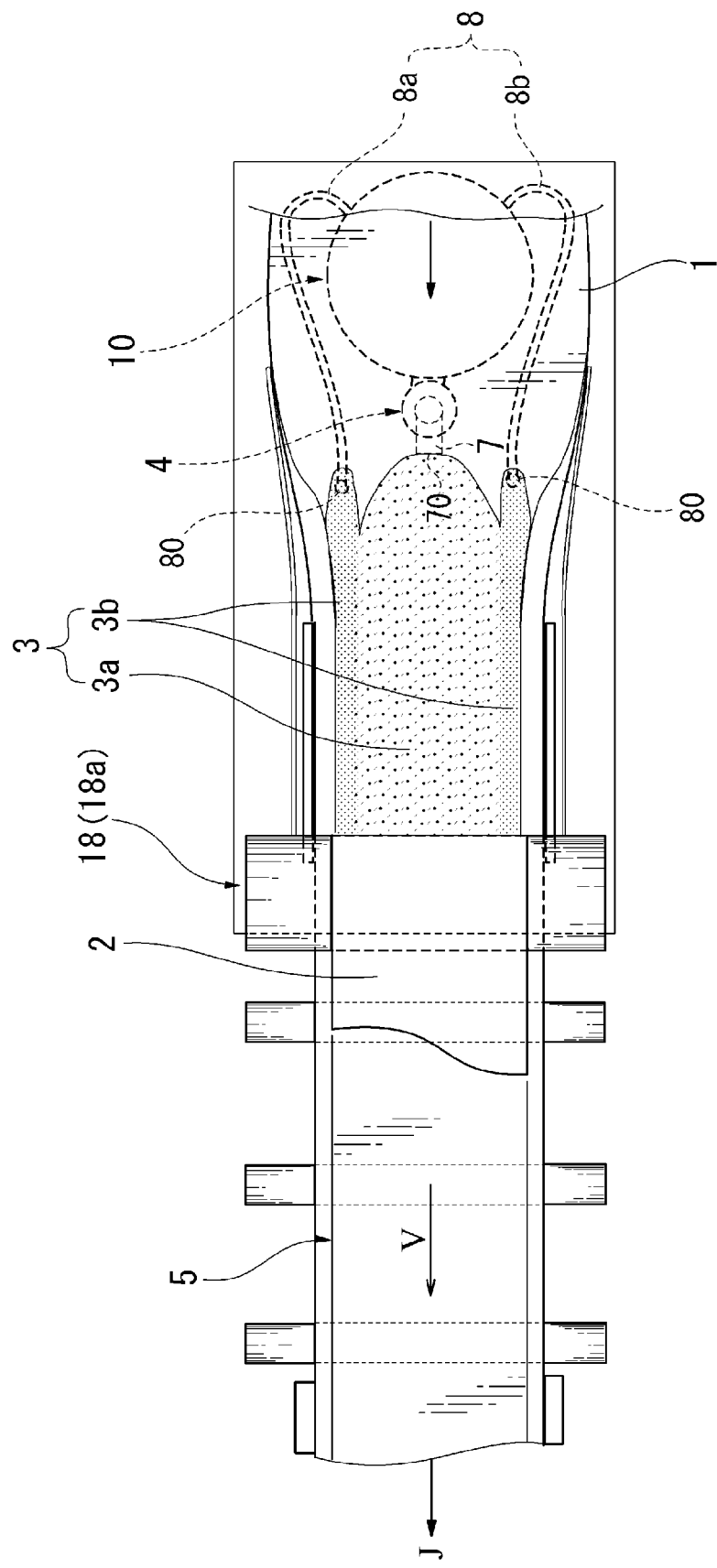
FIG. 2 is a partial plan view schematically illustrating an arrangement of a gypsum board manufacturing apparatus.

FIG. 1 is an explanatory process diagram partially and schematically illustrating a forming process of gypsum boards, and FIG. 2 is a partial plan view schematically illustrating an arrangement of a gypsum board manufacturing apparatus.

A lower sheet of paper 1, which is a sheet of paper for a gypsum board liner, is conveyed along a line of production. A mixer 10 is located in a predetermined position in relation to a conveyance line, e.g., in a position above the conveyance line. Powder materials P (calcined gypsum, adhesive agent, set accelerator, additives, admixture and so forth) and liquid (water) L are fed to the mixer 10. The mixer 10 mixes these materials and discharges slurry (calcined gypsum slurry) 3 onto the sheet 1 by means of a slurry delivery section 4, a slurry discharge pipe 7 and conduits for fractionation 8 (8a, 8b). The slurry delivery section 4 is located so as to receive the slurry effluent from a periphery of the mixer 10 and introduce the slurry into the pipe 7. Foam M produced by foam production means (not shown) is fed to the section 4. The pipe 7 is so positioned as to pour the slurry of the section 4 onto a widthwise center area of the sheet 1 (a core area) through a slurry discharge port 70. The conduits 8a, 8b are so arranged as to pour onto widthwise end portions (edge zones) of the sheet 1, the slurry 3 effluent from the periphery of the mixer 10. Instead of the foam M, a foaming agent may be directly fed to the slurry, so that the foam can be produced within the slurry by a foaming action of the foaming agent in the slurry.

The sheet 1 is conveyed together with the slurry 3 to reach a pair of forming rollers 18 (18a, 18b). An upper sheet of paper 2 travels partially around a periphery of the upper roller 18a to convert its direction toward a conveyance direction. The diverted sheet 2 is brought into contact with the slurry 3 on the lower sheet 1 and transferred in the conveyance direction to be substantially in parallel with the lower sheet 1. A continuous three-layered belt-like formation 5 constituted from the sheets 1,2 and the slurry 3 is formed on a downstream side of the rollers 18. This formation 5 runs continuously at a conveyance velocity V while a setting reaction of the slurry 3 proceeds, and it reaches roughly cutting rollers 19 (19a, 19b). If desired, a variety of forming means may be employed instead of the forming rollers 18, such as the forming means using a passing-through action of an extruder, a gate with a rectangular opening, and so forth.

The cutting rollers 19 sever the continuous formation into boards of a predetermined length, so as to make boards having a gypsum core covered with the sheets of paper, i.e., green boards. Then, the green boards are conveyed through a dryer (not shown) which is located in a direction shown by an arrow J (on a downstream side in the conveyance direction), whereby the green boards are subjected to forced drying in the dryer. Thereafter, they are cut to be boards, each having a predetermined product length, and thus, gypsum board products are successively produced.

Figure 3:
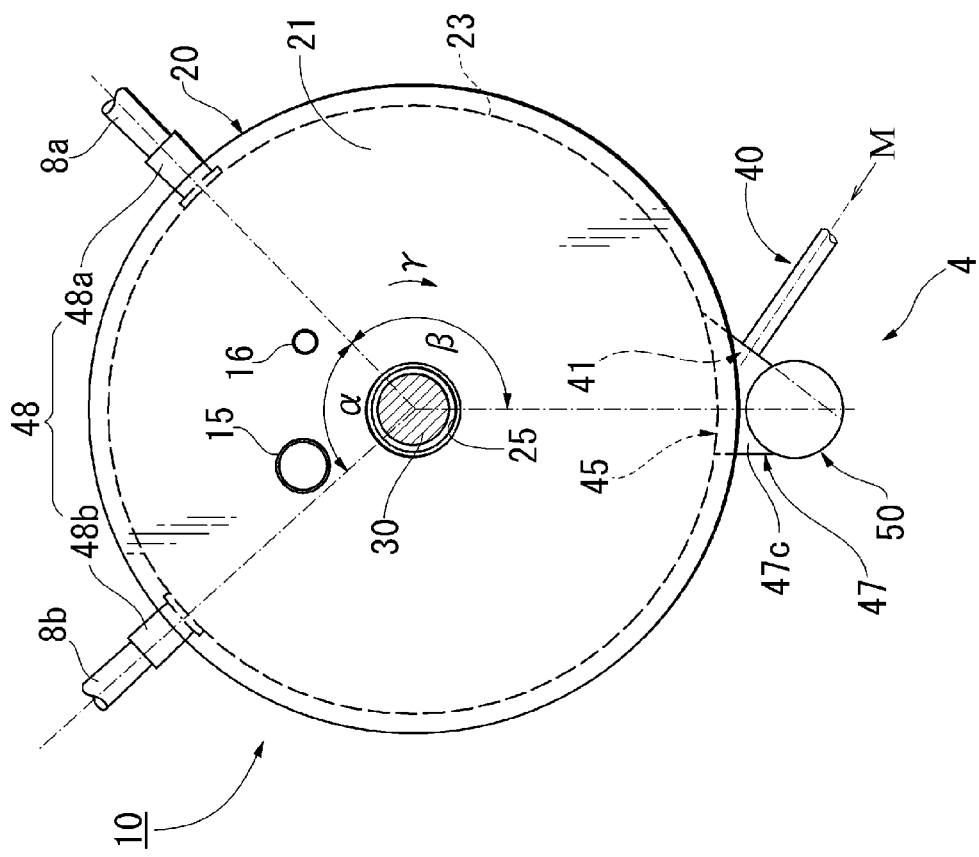
FIG. 3 is a plan view illustrating a whole arrangement of a mixer as shown in FIGS. 1 and 2.
Figure 4:
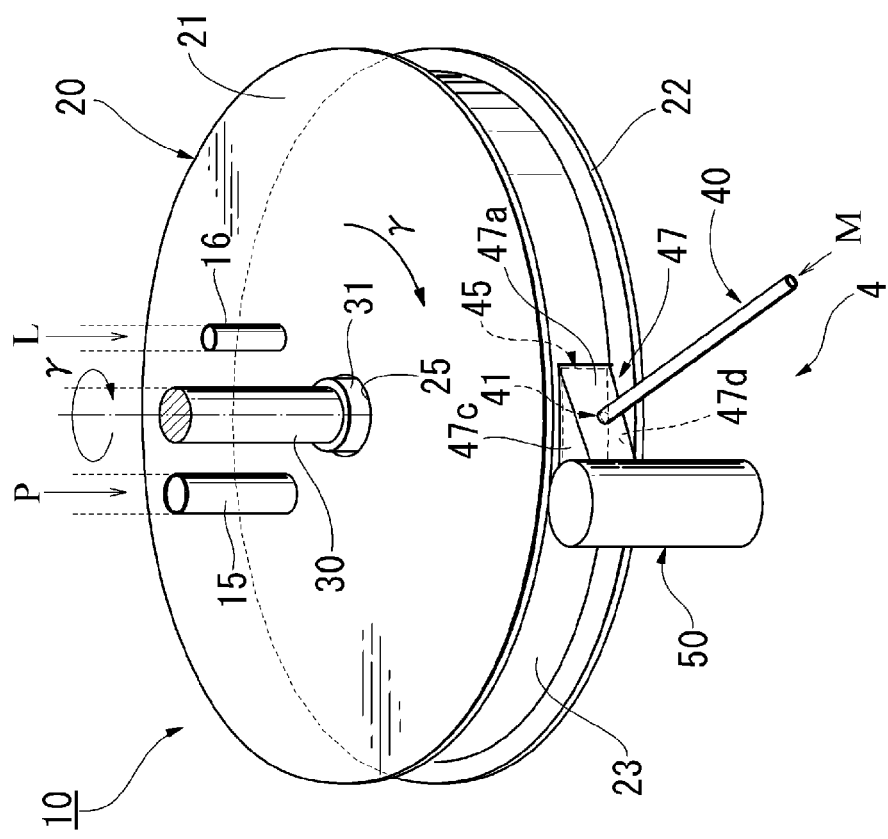
FIG. 4 is a perspective view illustrating the whole arrangement of the mixer.
Figure 5:
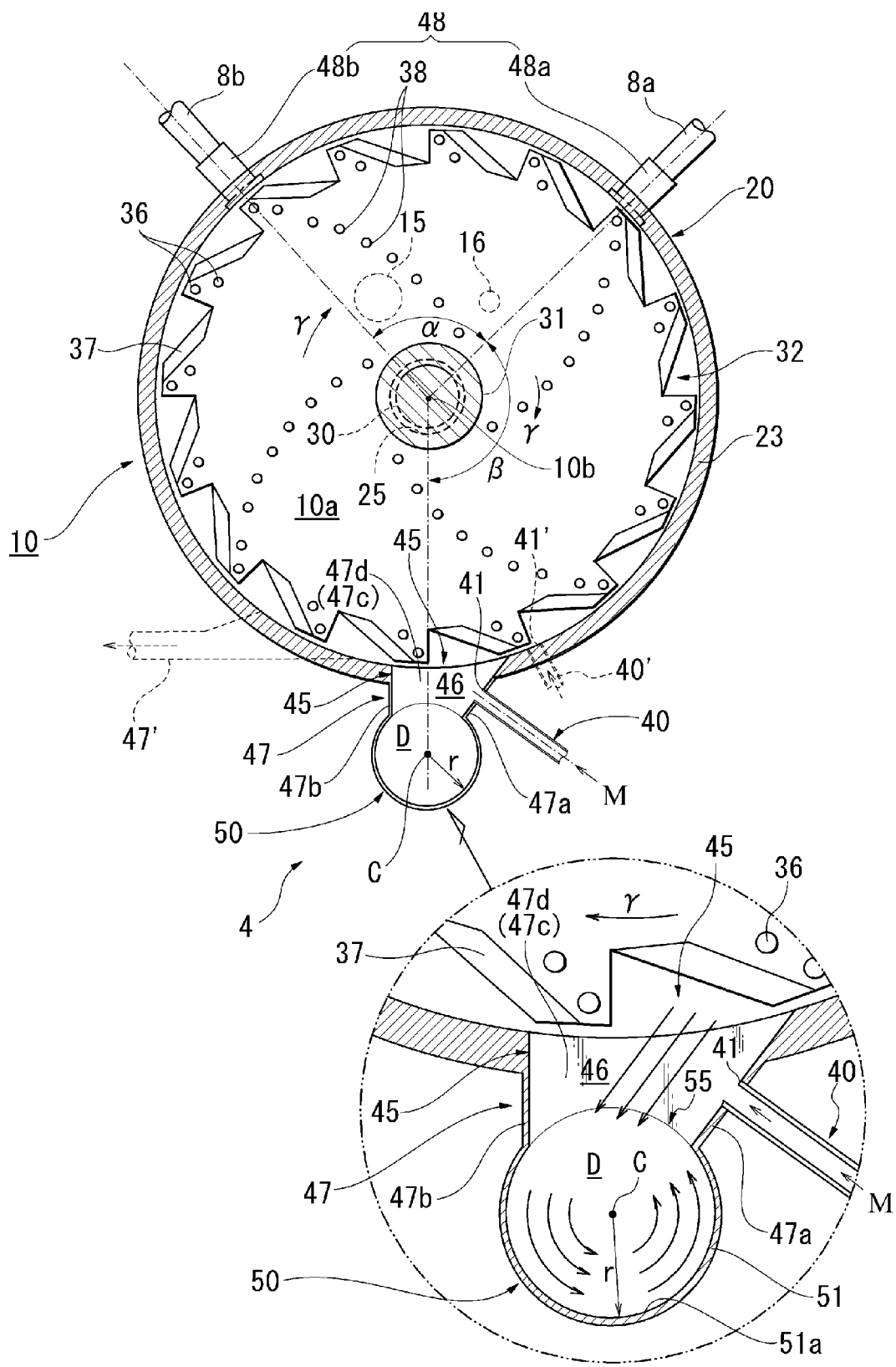
FIG. 5 includes a transverse cross-sectional view and a partially enlarged view showing an internal structure of the mixer.
Figure 6:
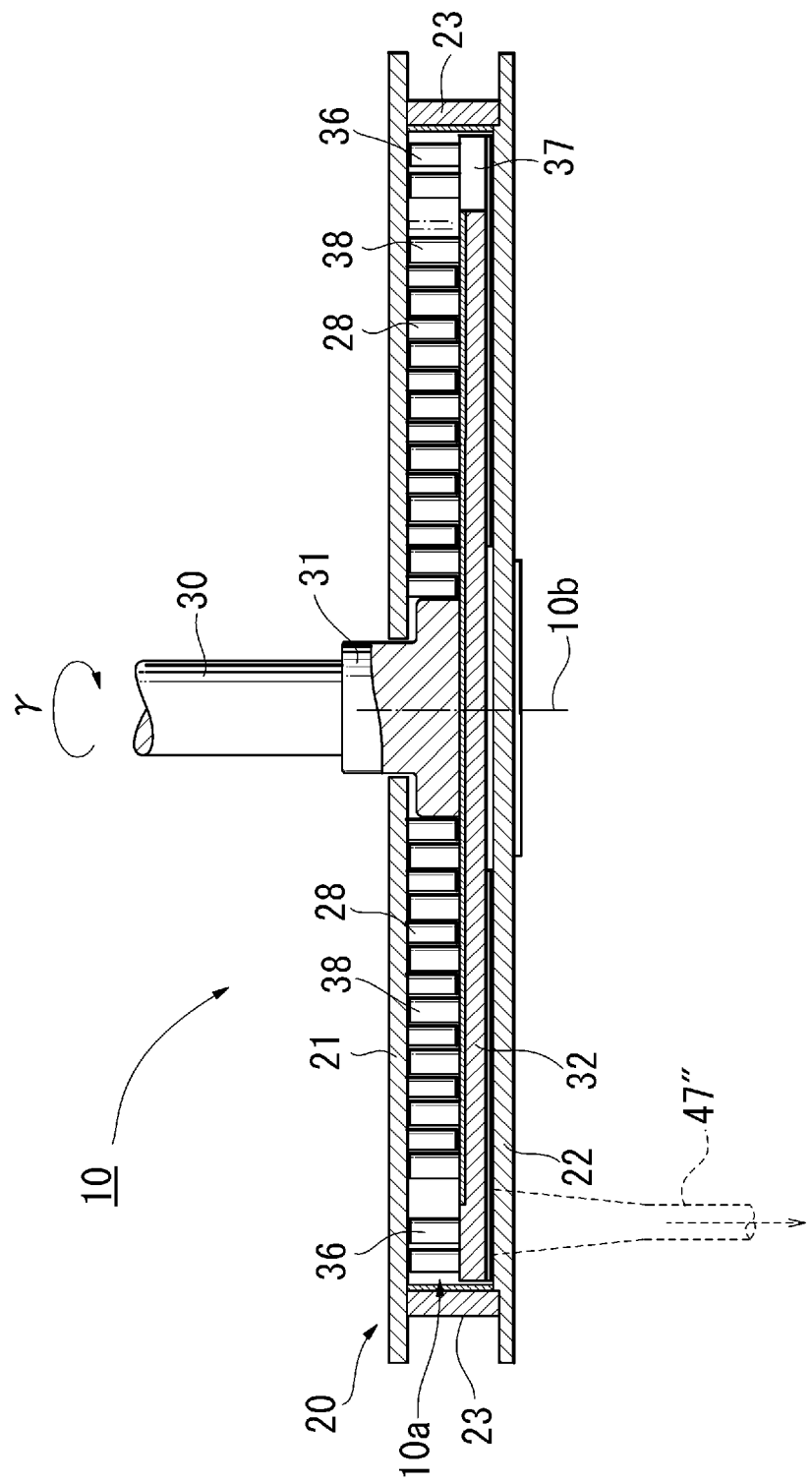
FIG. 6 is a vertical cross-sectional view showing the internal structure of the mixer.
Figure 7:
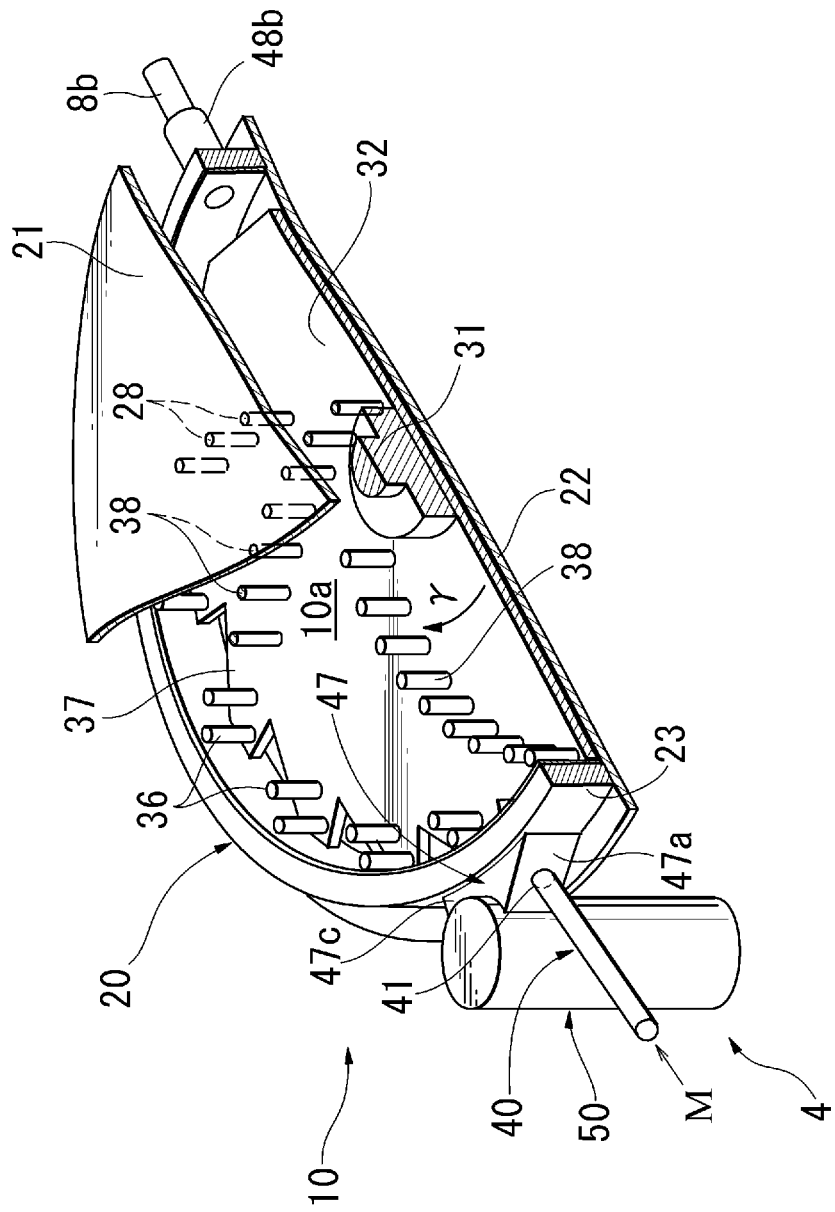
FIG. 7 is a fragmentary sectional perspective view showing the internal structure of the mixer.

FIGS. 3 and 4 are plan and perspective views illustrating the whole arrangement of the mixer 10, and FIGS. 5, 6 and 7 are transverse and vertical cross-sectional views and a fragmentary sectional perspective view showing an internal structure of the mixer 10.

As shown in FIGS. 3 and 4, the mixer 10 has a flattened cylindrical housing or casing 20 (referred to as "casing 20" hereinafter). The casing 20 has a horizontal disk-like upper plate or top cover 21 (referred to as "upper plate 21" hereinafter), a horizontal disk-like lower plate or bottom cover 22 (referred to as "lower plate 22" hereinafter), and an annular wall or outer peripheral wall 23 (referred to as "annular wall 23" hereinafter) which is positioned in peripheral portions of the upper and lower plates 21, 22. The plates 21, 22 are positioned, vertically spaced apart at a predetermined distance, so that an internal mixing area 10a for mixing the powder materials P and liquid (water) L is formed in the mixer 10. A circular opening 25 is formed at a center part of the upper plate 21. An enlarged lower end portion 31 of a rotatable vertical shaft 30 extends through the opening 25. The shaft 30 is connected with rotary drive means, such as an electric drive motor (not shown), and driven in rotation in a predetermined rotational direction (clockwise direction γ as seen from its upper side, in this embodiment). If desired, a variable speed device, such as a variable speed gear mechanism or belt assembly, may be interposed between the shaft 30 and an output shaft of the rotary drive means.

A powder supply conduit 15 for feeding the area 10a with the powder materials P to be mixed is connected to the upper plate 21. A water supply conduit 16 for supplying a quantity of mixing water L to the area 10a is also connected to the upper plate 21. If desired, an internal pressure regulator (not shown) for limiting excessive increase of the internal pressure and so forth may be further connected to the upper plate 21.

On an opposite side of the section 4, fractionation ports 48 (48a, 48b) are provided on the annular wall 23. The conduits 8a, 8b are connected to the ports 48a, 48b, respectively. The ports 48a, 48b are positioned, spaced at a predetermined angle α from each other. Feeding ports of the conduits 15, 16 open within a range of the angle α in a center region of the upper plate 21, respectively.

As shown in FIG. 5, a slurry outlet port 45 of the slurry delivery section 4 is positioned on the annular wall 23, spaced at a predetermined angle β from the fractionation port 48a in the rotational direction γ (on the downstream side). The port 45 opens on an internal circumferential surface of the wall 23. A foam feeding conduit 40, which feeds the foam M to the slurry for adjusting the specific gravity of the slurry, is connected to a hollow connector part 47 of the section 4. A foam feeding port 41 of the conduit 40 opens on an internal wall surface of the connector part 47. The port 41 is positioned on a downstream side of the port 45 in proximity thereto. If necessary, foam feeding ports (not shown) may be additionally provided on the ports 48 (48a, 48b) to feed the slurry with the foam M for adjusting the specific gravity of the slurry.

As shown in FIGS. 5 to 7, a rotary disc 32 is rotatably positioned in the casing 20. A lower face of the end portion 31 of the shaft 30 is fixedly secured to a center part of the disc 32. The center axis 10b of the disc 32 coincides with an axis of rotation of the shaft 30. The disc 32 is rotated with rotation of the shaft 30 in a direction as indicated by the arrow γ (clockwise direction).

A number of lower pins (movable pins) 38 are arranged on the rotary disc 32 in a plurality of rows extending generally in its radial direction. The lower pins 38 are vertically fixed on the upper surface of the disc 32 in its inward zone. The disc 32 is formed with a number of tooth configurations 37 in its peripheral zone, in this embodiment. The tooth configurations 37 act to displace or energize the mixed fluid (slurry) in an outward and rotational direction. A plurality of pins 36 are vertically fixed on each of the tooth configurations 37.

As shown in FIGS. 6 and 7, a number of upper pins (stationary pins) 28 are fixed to the upper plate 21 to depend therefrom in the internal mixing area 10a. The upper pins 28 and the lower pins 38 are alternately arranged in the radial direction of the disc 32 so that the pins 28, 38 make relative motions for mixing and stirring the materials of gypsum board in the casing 20 when the disc rotates.

When gypsum boards are produced, the rotary drive means of the mixer 10 is operated to rotate the rotary disc 32 in the direction of arrow γ, and the ingredients (powder materials) P and the mixing water L to be mixed in the mixer 10 are fed to the mixer 10 through the powder supply conduit 15 and the water supply conduit 16. The ingredients and water are introduced into the inner region of the mixer 10, stirred therein and mixed with each other, while moving radially outward on the disc 32 under the action of centrifugal force and moving circumferentially at the peripheral zone.

A part of the slurry produced in the area 10a flows into the conduits 8a, 8b through the fractionation ports 48a, 48b, and the slurry is discharged through the conduits 8a, 8b onto the edge zones of the lower sheet 1 (FIG. 1). In this embodiment, each of the ports 48a, 48b is not provided with a foam feeding port, and therefore, the slurry 3b (FIG. 2) fed to the edge zones through the ports 48a, 48b, which does not include the foam, has a relatively high specific gravity, in comparison with the slurry 3a (FIG. 2) fed to the core zone through the hollow connector part 47. If each of the ports 48a, 48b is provided with a foam feeding port (not shown), a small amount of foam is fed to the slurry at each of the ports 48a, 48b. Even in such a case, the slurry 3b fed to the edge zones through the ports 48a, 48b usually has a relatively high specific gravity, in comparison with the slurry 3a fed to the core zone through the hollow connector part 47.

Most of the slurry produced in the mixing area 10a is displaced outward and frontward in the rotational direction by the tooth configurations 37, and the slurry flows out through the slurry outlet port 45 of the slurry delivery section 4 in an approximately tangential direction, as shown by arrows in a partially enlarged view of FIG. 5. The hollow connector part 47 is constructed from a vertical side wall 47a on the upstream side, a vertical side wall 47b on the downstream side, a horizontal top wall 47c and a horizontal bottom wall 47d. The wall 47a extends in the approximately tangential direction with respect to the annular wall 23. The port 45 and the connector part 47 open to the internal mixing area 10a of the mixer 10, so that they receive the slurry of the area 10a generally in the approximately tangential direction. The slurry delivery section 4 further includes a vertical chute 50 having a cylindrical form. The upstream open end of the connector part 47 is connected to the edge portion of the port 45. The downstream open end of the part 47 is connected to an upper opening 55 formed at an upper part of a cylindrical wall of the chute 50.

The slurry flows into a slurry fluid passage 46 of the connector part 47 from the port 45, and then, flows into the vertical chute 50 through the opening 55. The foam feeding port 41 is located on the wall 47a on the upstream side in the rotational direction, so that the foam M is fed to the slurry immediately after entering the passage 46 through the port 45.

As shown by dotted lines in FIG. 5, the foam feeding conduit 40 may be replaced with a foam feeding conduit 40', which is connected to the annular wall 23 and which has a foam feeding port 41' opening on an inner circumferential wall surface of the wall 23. In such an arrangement for feeding the foam, the foam is fed to the slurry which is about to flow out through the port 45. The slurry in the peripheral zone, which is fed with the foam, promptly flows through the port 45 into the passage 46 in an approximately tangential direction, immediately after the foam mixes into the slurry, and then, the slurry flows into the chute 50 from the passage 46.

Figure 9:
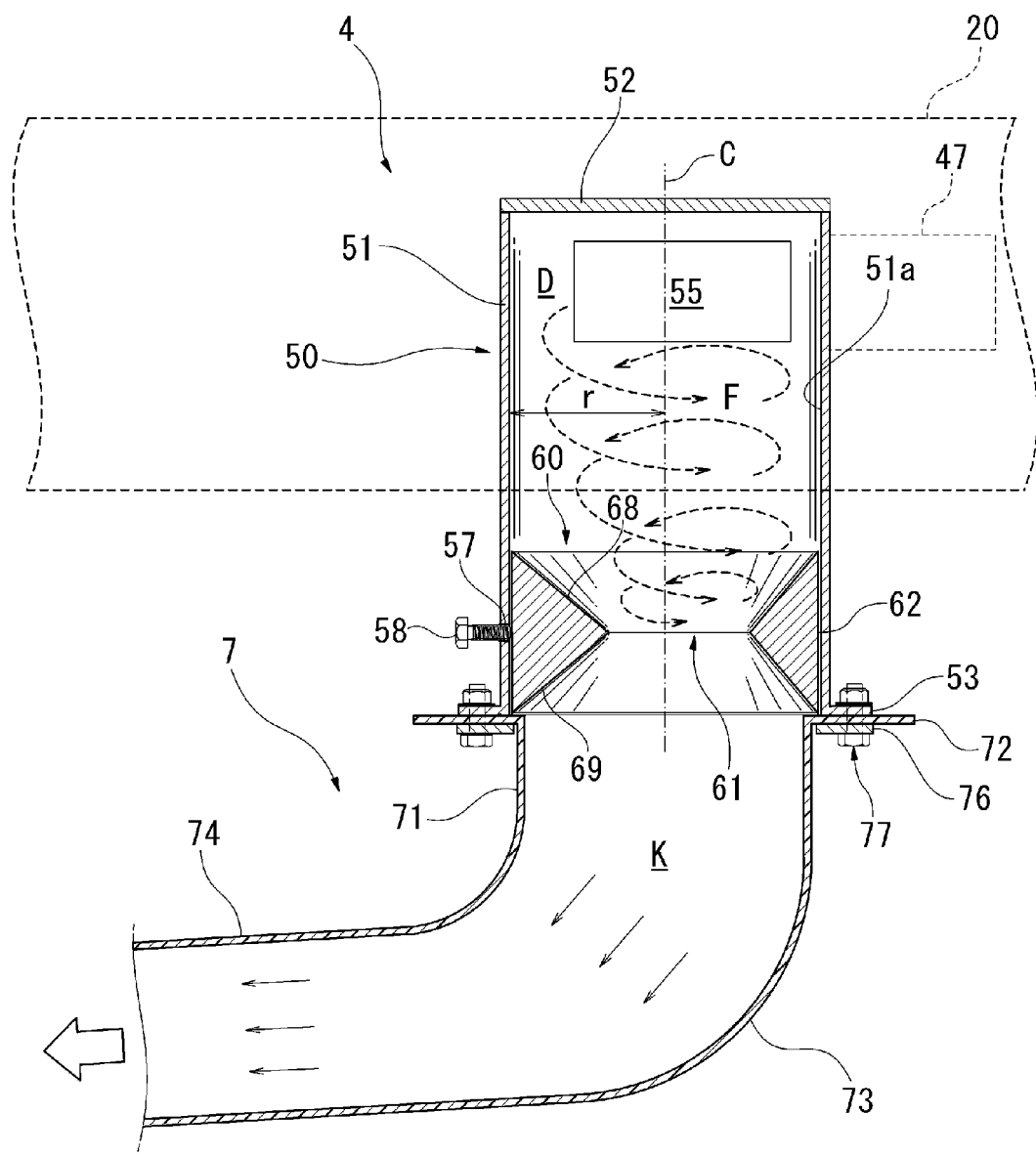
FIG. 9 is a longitudinal cross-sectional view of the vertical chute.

As shown in FIG. 5, the vertical chute 50 has an inside area D residing on an upstream side of an orifice member 60 as shown in FIGS. 8 and 9 (referred to as "upstream inside area D" hereinafter), and the upstream inside area D has a round transverse cross-section with a radius r, a center of which is a vertically extending center axis C. The connector part 47 is connected to the chute 50 in a condition eccentrically on one side (at the position eccentric on the side nearing to the wall 23 in this embodiment). Therefore, the passage 46 opens to the upstream inside area D in a position eccentric on one side. In this invention, the chute may have a center axis C inclined with respect to the vertical direction. Further, as shown by dotted lines in FIGS. 5 and 6, one end (upstream end) of a tube 47', 47", such as a resin tube, may be connected to a slurry outlet port provided on the annular wall 23 or the lower plate 22, and the other end (downstream end) of the tube 47', 47" may open to an upper space inside the chute.

The slurry and the foam entering the upstream inside area D turn around the center axis C of the chute 50, so that the slurry swirls along an inside circumferential wall surface of the area D. Owing to the swirling motion or turning motion of the slurry in the area D, the slurry and the foam are subjected to a shearing force, whereby they are mixed with each other, so that the foam is uniformly dispersed in the slurry. The slurry in the chute 50 gravitationally flows down therein so as to be discharged to the widthwise center area of the lower sheet 1 through the pipe 7 (FIG. 1). Thus, the part 47, the chute 50 and the pipe 7 constitutes a tubular passage for feeding the slurry onto the sheet of paper for gypsum board liner.

FIGS. 8 and 9 include a transverse cross-sectional view, a perspective view and a vertical cross-sectional view showing the structure of the vertical chute 50, wherein the casing 20 and the connector part 47 are shown by imaginary lines (dotted lines).

The vertical chute 50 is constituted from a cylindrical body 51 made of metal and having a radius r (inside dimension), a circular top plate 52 made of metal and closing the circular top opening of the body 51, an annular flange portion 53 integrally and outwardly protruding from a periphery of a lower end edge of the body 51, and the orifice member 60 located at a lower portion of the upstream inside area D. The discharge pipe 7, which is an L-shaped pipe made of rubber or resin and which is also called as "boot(s)", is connected to the downstream side of the chute 50 in series. The pipe 7 includes a vertical tubular portion 71 and an annular flange portion 72 integrally and outwardly protruding from a periphery of an upper end edge of the tubular portion 71. The flange portion 72 is clamped between the flange portion 53 and an annular metal plate 76 by tightening force of bolt-nut assemblies 77, so that the tubular portion 71 and the body 51 are integrally connected with each other. The pipe 7 further includes a bent tube (elbow tube) portion 73 continuous with the tubular portion 71, and a transversely extending tubular portion 74 continuous with the portion 73. The tubular portion 74 opens at the slurry discharge port 70 (FIG. 2).

Figure 10:
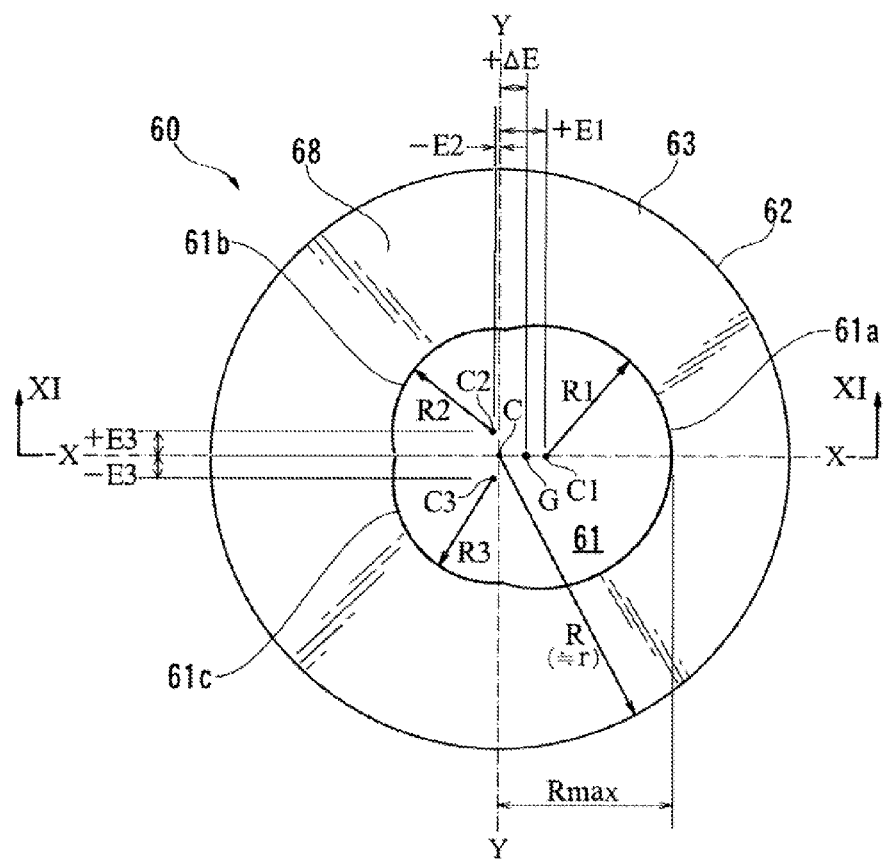
FIG. 10 is a plan view of an orifice member.
Figure 11:
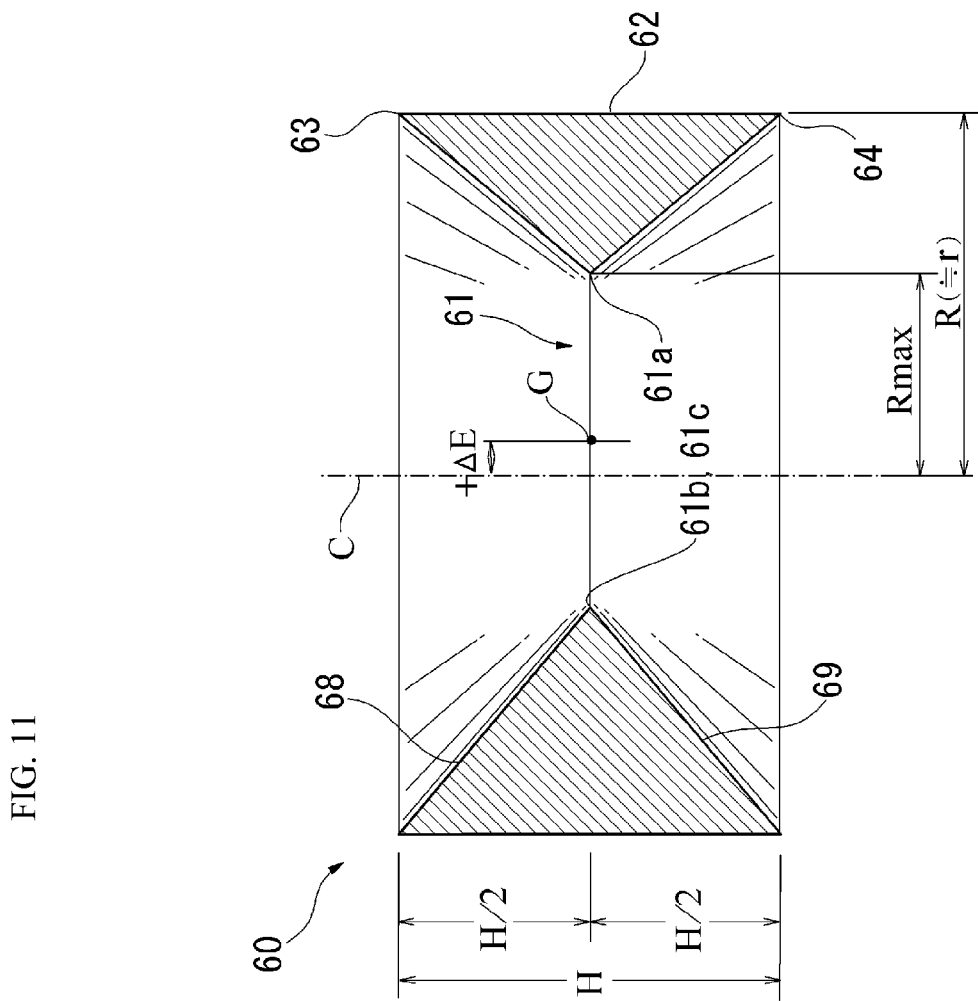
FIG. 11 is a cross-sectional view of the orifice member taken along a line XI-XI of FIG. 10.

The orifice member 60 is an integrally formed metal article, which has a flattened columnar configuration in general. The orifice member 60 has an opening 61 for communication between the upstream inside area D of the chute 50 and an inside area K of the pipe 7 on the downstream side of the orifice member 60 (referred to as "downstream inside area K" hereinafter). FIG. 10 is a plan view of the orifice member 60, and FIG. 11 is a cross-sectional view taken along a line XI-XI of FIG. 10. The bottom view of the orifice member 60 is the same as its plan view.

The orifice member 60 has a perfect circle profile of a radius R (a diameter 2R) in its plan view. The radius R is substantially the same as the radius r of the chute 50, or slightly smaller than the radius r. Therefore, an outer circumferential surface 62 of the orifice member 60 is in contact with the inner circumferential surface 51a of the body 51 without creation of a gap therebetween, or in sliding contact with the surface 51a.

As shown in FIG. 10, the opening 61 of the orifice member 60, which forms an orifice passage, has a contour of a composite figure which is constituted from circular openings 61a, 61b, 61c superimposed with each other, each having a radius of R1, R2, R3 respectively. In the X-Y coordinate system (i.e., the horizontal rectangular coordinate system having its origin on the center axis C) as shown in FIG. 10, positions of the centers C1, C2, C3 of the respective circular openings 61a, 61b, 61c are shifted in the direction of X axis and/or the direction of Y axis. That is, with respect to the central axis C of the orifice member 60, the center C1 of the circular opening 61a is displaced by +E1 in the X-axis direction, the center C2 of the circular opening 61b is displaced by −E2 in the X-axis direction and +E3 in the Y-axis direction, and the center C3 of the circular opening 61c is displaced by −E2 in the X-axis direction and −E3 in the Y-axis direction, and therefore, the centroid or the center of gravity G in the composite figure formed by the circular openings 61a, 61b, 61c is displaced by +ΔE in the X-axis direction. In a case where the eccentricity ratio η of the opening 61 is defined to be "eccentric distance ΔE/radius r of upstream area D", the eccentricity ratio η can be preferably set in a range equal to or greater than 0.06 (if desired, in the range equal to or greater than 0.10). In a case where the eccentricity ratio η' of the opening 61 is defined to be "eccentric distance ΔE/maximum value Rmax", the value of the eccentricity ratio η' can be preferably set in the range equal to or greater than 0.1 (if desired, in the range equal to or greater than 0.15), wherein the maximum value of the distance between the center axis C and the contour of the composite figure (the edge of the opening 61) is defined as Rmax.

As shown in FIG. 11, the opening 61 is positioned horizontally at the height of H/2, wherein H represents the overall height of the orifice member 60. Inclined surfaces 68, 69 formed in a mortar shape or conical surface extend between the opening 61 and the upper and lower circular edges 63, 64 of the outer circumferential surface 62.

As shown in FIGS. 8 and 9, the orifice member 60 is located at a lowermost position of the cylindrical body 51. The bolt 58 is threadedly engaged with the bolt hole 57 of the body 51 and a tip of the bolt 58 is pressed against the outer circumferential surface 62 under a tightening force of the bolt 58. The orifice member 60 is locked at the lowermost portion of the body 51 by means of the bolt 58.

A plurality of bolt holes 65, which are circumferentially spaced apart from each other (shown by dotted lines in FIG. 8), are provided on the outer peripheral surface of the orifice member 60. A lower portion of the peripheral wall of the body 51 is provided with a rectangular opening 54 circumferentially elongated. A tip portion of the thread of the bolt 56 is engaged with the bolt hole 65 of the orifice member 60 which is positioned in an area of the opening 54. The bolt 56 extends outward of the cylindrical body 51 through the opening 54. The orifice member 60 can be manually rotated around the center axis C by temporarily loosening the tightening force of the bolt 58 and pressing a head portion of the bolt 56 leftward or rightward. The directional property (anisotropy) or the relative position of the opening 61 can be changed with respect to the tubular passage (the inside upstream area D) by turning the orifice member 60, whereby intensity of the axisymmetric vortex breakdown action or function can be controlled or adjusted. In other words, the mechanism for turning the orifice member 60 (the bolt hole 65, the opening 54, and the bolt 56) constitutes the cross-section adjusting means for the orifice passage, which variably controls or adjusts the axisymmetric vortex flow breakdown action or function of the orifice passage.

Variation or adjustment of the cross-section of the fluid passage due to rotation of the orifice member 60 can be carried out not only before operation of the mixer 10, but also during operation of the mixer 10. With use of such adjusting means for adjusting the cross-section of the orifice passage, a delicate change or fine adjustment can be carried out for optimization of the action or function of the orifice passage, while observing or measuring the condition or physical property of the slurry 3a flowing from the mixer 10 to the lower sheet 1. This is quite useful in practice. According to the inventor's experiments, the condition or physical property of the slurry 3a fed to the lower sheet 1 can be changed, when the orifice member 60 is rotated around the center axis C by at least 3 degrees. Therefore, intensity of the axisymmetric vortex flow breakdown action can be variably controlled or adjusted by rotation of the orifice member 60 through an angle of at least 3 degrees.

As shown in FIG. 8, swirling power or rotational power is given to the slurry flowing into the upstream inside area D, owing to eccentricity of the area D and the slurry fluid passage 46. As the result, the slurry gravitationally flows down while swirling along the inner circumferential wall surface of the area D, as shown by an intratubular swirling flow F (shown by dotted arrows in FIG. 9), whereby an axisymmetric vortex flow in a form of helical or cyclone flow is generated in the area D. The turning direction of the slurry (counterclockwise direction) is opposite to the rotational direction γ of the rotary disc 32 (FIG. 5). The slurry is subjected to a mixing and stirring action in the area D, owing to its swirling motion. A turning radius of the swirling flow F is gradually reduced as the cross-section of the area D is reduced by the inclined surface 68 and the opening 61.

The configuration of the opening 61 in its plan view, which is the composite figure constituted from the circular openings 61a, 61b, 61c superimposed with each other, is non-axisymmetric with respect to the center axis C. Further, the opening 61 has the center of gravity G lateralized by +ΔE in the X-axis direction, as shown in FIG. 10. Therefore, the axisymmetric (rotationally symmetric) vortex flow made by the intratubular swirling flow F is collapsed at the opening 61. The swirling flow F after passing through the opening 61 gradually increases its radius, since the cross-section of the fluid passage is enlarged in accordance with the configuration of the inclined surface 69. As the result, the swirling flow F is apt to regenerate its original formation of the swirling flow F in the downstream area K. However, the axisymmetric vortex flow (the intratubular swirling flow F) is collapsed at the opening 61, so that the flow of slurry is disturbed at or near the opening 61. Therefore, the swirling flow like the flow F is not regenerated in the downstream area K, and a considerably weak swirling flow, which has a small revolving velocity component in comparison with that of the swirling flow F, is merely regenerated in a flow field of the downstream area K. Such a swirling motion almost disappears during flowing through the transversely extending tubular portion 74. Therefore, the flow of slurry, which has almost lost its revolving velocity component, flows through the slurry discharge port 70 (FIG. 2) onto the lower sheet 1.

Figure 12:
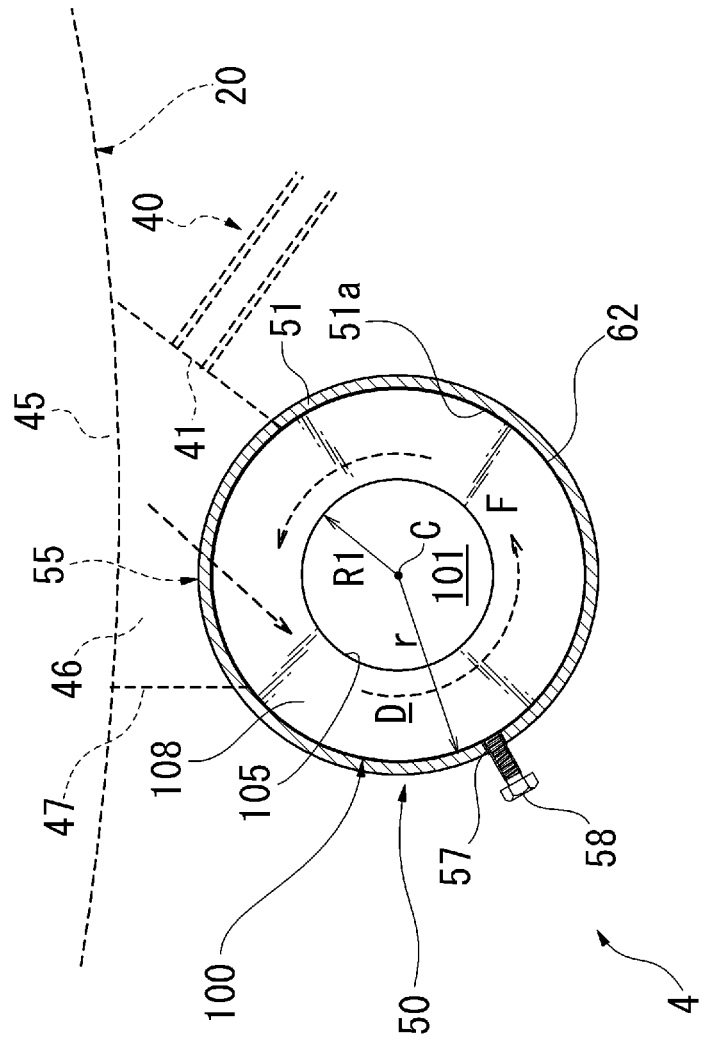
FIG. 12 is a transverse cross-sectional view of the chute having an orifice member of a comparative example.
Figure 13:
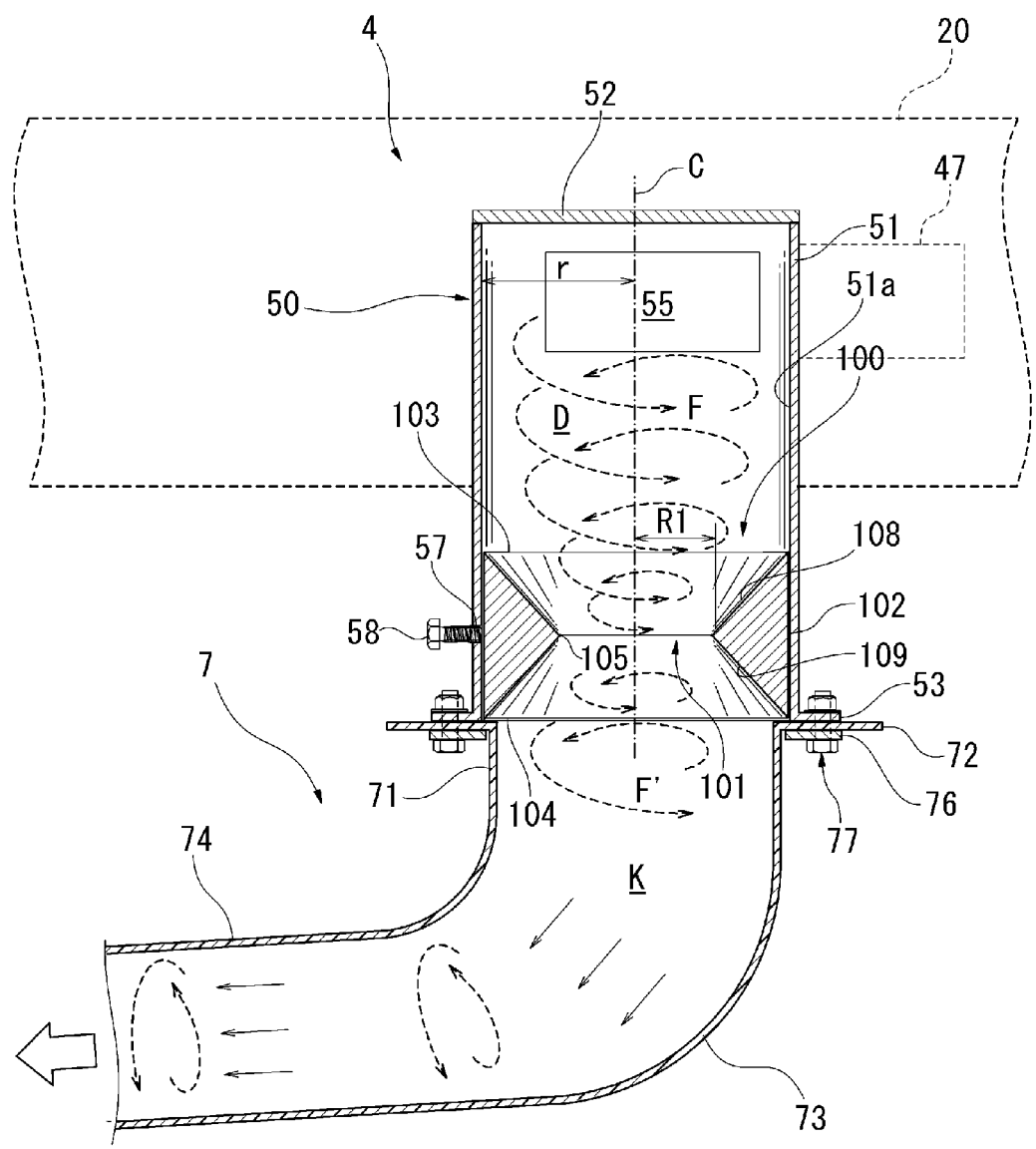
FIG. 13 is a longitudinal cross-sectional view of the chute as shown in FIG. 12.

FIGS. 12 and 13 are transverse and longitudinal cross-sectional views of the chute 50 having an orifice member 100 which is a comparative example, wherein the casing 20 and the connector part 47 are shown by imaginary lines (dotted lines).

The chute 50 having an orifice member 100 with a conventional structure is shown as the comparative example in FIGS. 12 and 13. Similarly to the orifice member 60, the orifice member 100 has the outer peripheral configuration which is a perfect circle of the radius R (diameter 2R) in its plan view, and its outer circumferential surface 102 is adapted to be in contact with the inner circumferential surface of the chute 50 without a gap therebetween, or in sliding contact therewith. An opening 101 of the orifice member 100 has a contour 105 which is a perfect circle of the radius R1, a center of which is the center axis C. The opening 101 is positioned horizontally at the height of H/2 wherein H represents an overall height of the orifice member 100, similarly to the orifice member 60. Inclined surfaces 108, 109 formed in a mortar shape or a form of conical surface extend from upper and lower circular edges 103, 104 of the orifice member 100 to the circular opening.

As set forth above, the slurry flowing into the upstream inside area D is the axisymmetric vortex flow in a form of helical or cyclone flow illustrated as the intratubular swirling flow F (shown by dotted arrows), which gravitationally flows down, while swirling along an inner circumferential wall surface of the area D. The turning radius of the intratubular swirling flow F is reduced gradually in the area D, as the cross-section of the area D is reduced by the inclined surface 108 and the opening 101. After passing through the opening 101, the swirling flow F increases its turning radius gradually as the cross-section of the fluid passage is enlarged by the inclined surface 109, until an intratubular swirling flow similar to the flow F is recovered in the downstream area K. Thus, the swirling flow similar to the swirling flow F is regenerated in the flow field of the downstream area K. Although the swirling flow F' regenerated in the downstream area K is an axisymmetric vortex flow attenuated in its turning velocity component in comparison with the flow F, the turning velocity component of the flow F' does not disappear during flowing through the tubular portion 74, and therefore, the turning velocity component substantially remains at the slurry discharge port 70 (FIG. 2). Thus, the turning flow of slurry flows through the port 70 (FIG. 2) onto the lower sheet 1.

FIGS. 14-17 are graphic diagrams showing the results of tests obtained by measuring the distribution of the specific gravity of the gypsum core, with respect to a gypsum board manufacturing apparatus having the orifice member 60 (embodiment of the present invention) as shown in FIGS. 8-11 and the gypsum board manufacturing apparatus having the orifice member 100 (comparative example) as shown in FIGS. 12 and 13, respectively.

The present inventors experimentally produced gypsum boards with use of the gypsum board manufacturing apparatus with the orifice member 60 being installed in the vertical chute 50 (embodiment of the present invention). Further, the present inventors experimentally produced gypsum boards with use of the same apparatus with the conventional orifice member 100 (comparative example) being installed instead of the orifice member 60. The condition of production and the mixing proportion of materials are equal in these experiments. The produced boards are standard gypsum boards, each being 910 mm in breadth, 1820 mm in length and 12.5 mm in thickness.

In FIGS. 14(C) and 14(D), a method for obtaining test pieces for measurement of the distribution of the specific gravity is shown schematically. The present inventors cut off a middle part of the produced gypsum board M and extract therefrom a widthwise zone of the board having a lengthwise dimension of 150 mm. Further, the inventors cut away side edge portions N from the extracted part, in order to remove high specific gravity portions made of the fractionated slurry. The dimension of the side edge portion N is 50 mm. These edge portions correspond to edge portions of a gypsum board. Thus, the inventors obtained a test part Q in a form of rectangular plate, which is 810 mm in length and 150 mm in width, as shown in FIG. 14(D). The test part Q thus obtained is cut into ten test pieces S (S1-S10), each being 81 mm in width and 150 mm in length, and the specific gravity of each of the pieces S (S1-S10) is measured.

The values of specific gravity actually measured with respect to the gypsum core are shown in FIGS. 14(A) and 14(B), wherein the measured test pieces S (S1-S10) were extracted from gypsum boards, which were experimentally produced in a mixing proportion of materials and a production condition for setting the specific gravity of the gypsum core to be 0.7 (a target value). In FIGS. 14(A) and 14(B), the horizontal axes represent the widthwise positions in the gypsum board, which correspond to the respective test pieces S1-S10 as shown in FIG. 14(D), and the vertical axes represent the actually measured values of the specific gravity. FIG. 14(A) shows the test results with respect to the gypsum board produced by the gypsum board manufacturing apparatus provided with the orifice member 60 (embodiment of the present invention), and FIG. 14(B) shows the test results with respect to the gypsum board produced by the same apparatus provided with the orifice member 100 (comparative example).

As is apparent from the test results in FIGS. 14(A) and 14(B), the specific gravity of the core produced by the apparatus with the orifice member 100 (comparative example) considerably varies from 0.712 to 0.674 in the widthwise direction of the board, whereas the specific gravity of the core produced by the apparatus with the orifice member 60 (embodiment of the present invention) varies merely in a range of 0.697-0.694, and therefore, the specific value of the core represents substantially constant distribution in the widthwise direction of the board (embodiment of the present invention). This means the following:

(1) In a case where the orifice member 100 (comparative example) is used, a relatively intensive swirling flow is generated in the fluid passage on the downstream side of the orifice 100, so that the slurry tends to flow onto the sheet of paper in a condition that the slurry and foam are partially separated:

(2) On the other hand, in the case where the orifice member 60 (embodiment of the present invention) is used, the slurry flows through the slurry discharge pipe 7 onto the sheet in a condition that separation of the slurry and foam is substantially completely eliminated.

In FIGS. 15-17, actually measured values of the specific gravity of the gypsum cores are shown with respect to the test pieces S1-S10 extracted from the produced boards, wherein the gypsum boards were experimentally produced in the mixing proportions of materials and production conditions for setting the specific gravities of the cores to be 0.6, 0.5, and 0.4 (target values). In each of FIGS. 15-17, the diagram indicated by "(A)" shows the test results with respect to the gypsum boards produced by the apparatus with the orifice member 60 (embodiment of the present invention), and the diagram indicated by "(B)" shows the test results with respect to the gypsum boards produced by the apparatus with the orifice member 100 (comparative example).

As is understandable from the experimental results presented in FIGS. 15-17, in the case where the orifice member 100 (comparative example) is employed, the deviation of the specific gravity distribution is significantly increased when the target value of the specific gravity of the core is set to be equal to or less than 0.6. Especially, when the target value of the specific gravity is set to be 0.4, the difference between the measured maximum value and the measured minimum value exceeds 15% of the target value. On the other hand, in the case where the orifice member 60 (embodiment of the present invention) is employed, the deviation of the specific gravity distribution is not increased, and therefore, gypsum boards having a substantially constant distribution of the specific gravity can be produced. For example, even when the target value of the specific gravity of the core is set to be 0.4, the difference between the measured maximum value and the measured minimum values is merely about 2% of the target value. Therefore, employment of the orifice member 60 is extremely effective for reducing the weight of gypsum board.

Figure 18:
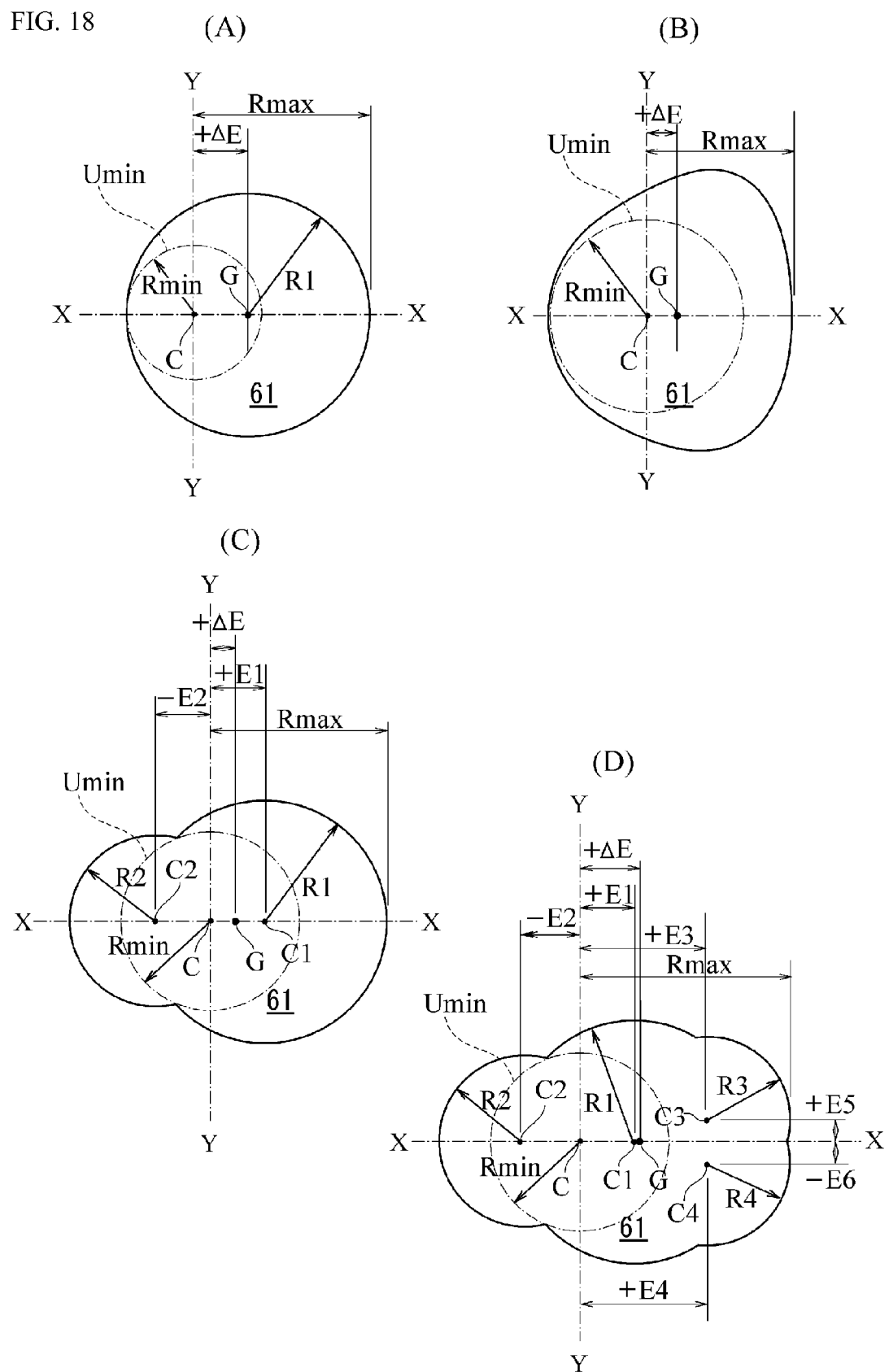
FIG. 18 includes plan views showing modifications of a planer contour of an opening as shown in FIG. 10.

FIG. 18 is a plan view showing modifications of the planer contour of the opening 61.

In the aforementioned embodiment, the contour of the opening 61 of the orifice member 60 has a composite figure constituted from the partially superimposed three openings 61a, 61b, 61c, each having a form of perfect circle. Alternatively, the contour of the opening 61 may be a single circle in a form of perfect circle which is generally shifted to displace the center (the centroid G) of the opening 61 to an eccentric position with respect to the center axis C, as shown in FIG. 18(A). The centroid G of the opening 61 may be displaced to an eccentric position with respect to the center axis C by deviating or deforming the contour of the opening 61, as shown in FIG. 18(B). The opening 61 may be a composite figure which is a combination of two perfect circles (center C1: C2, radius R1: R2, eccentricity +E1: −E2) as shown in FIG. 18(C), or a composite figure which is a combination of four perfect circles (center C1: C2: C3: C4, radius R1: R2: R3: R4, eccentricity +E1: −E2:+E3, +E5: +E4, −E6) as shown in FIG. 18(D). As is understandable from these modifications, the design of the contour of the opening 61 can be appropriately modified without departing from the gist of the invention.

Figure 19:
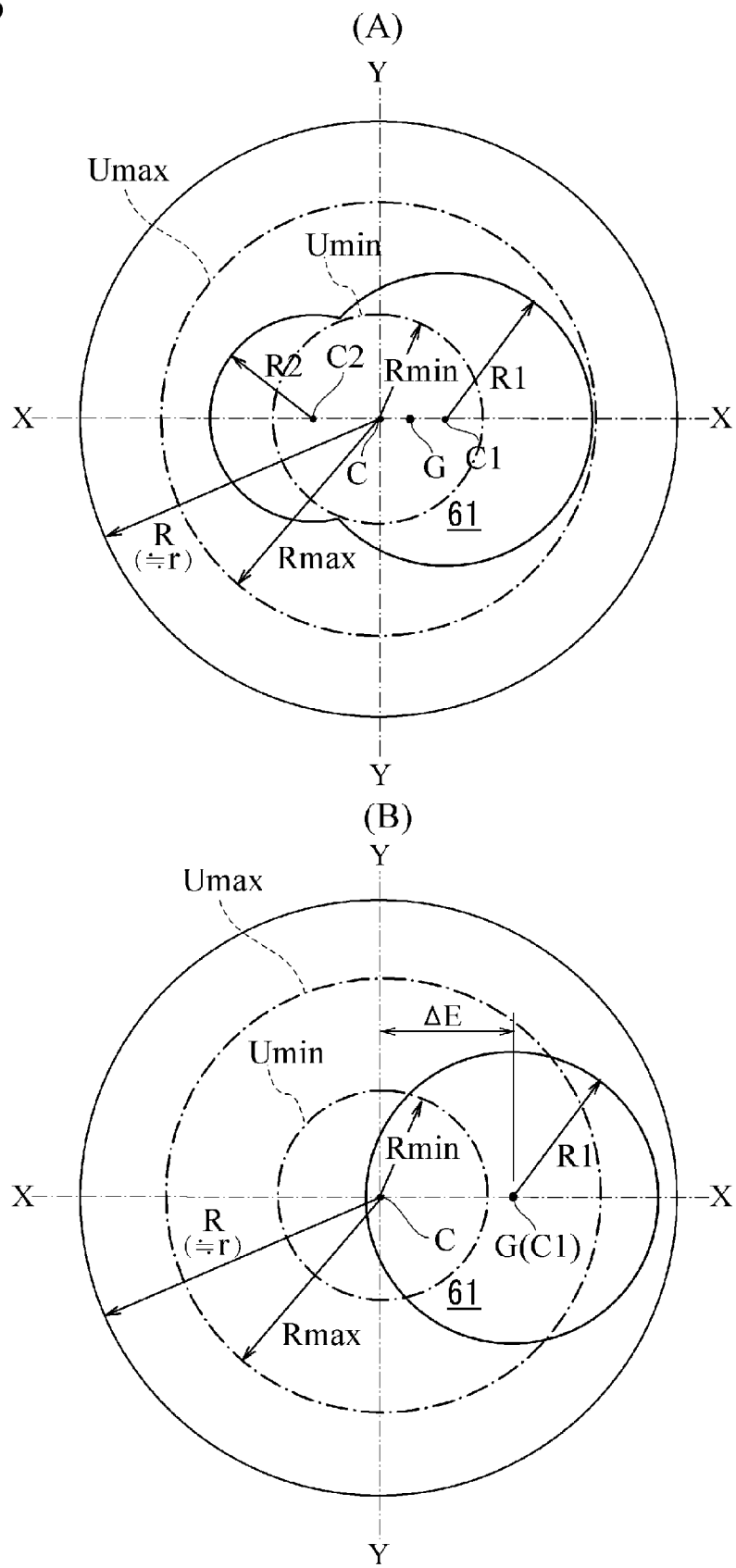
FIG. 19 includes plan views showing relationships between the opening and a center circle area.

Center circle areas Umin are shown in FIG. 18, each of the circles being a perfect circle with a radius Rmin, a center of which is on the center axis C. A relationship between a non-circular contour of the opening 61 and the center circle area Umin is shown in FIG. 19(A). As shown in FIG. 19(A), the opening 61 contains the area Umin of the radius Rmin and the opening 61 is contained in a maximum circle area Umax in a form of perfect circle having a radius Rmax. Preferably, the radius Rmin is set to be equal to or greater than 0.15× the radius r, and the radius Rmax is set to be equal to or smaller than 0.85× the radius r. Therefore, the contour of the opening 61 can be varied in the range from 0.15r to 0.85r, preferably, in the range from 0.2r to 0.8r, wherein "r" is the aforementioned radius.

In FIG. 19(B), a condition is shown in which the opening 61 in a form of perfect circle having a radius R1 is significantly decentered from the center axis C. The central axis C1 (the centroid G) of the opening 61 is positioned in an annular zone in a range from 0.2r to 0.8r, and therefore, the center circle area Umin is not contained in the opening 61 and the area Umin extends out of the opening 61. However, in such a condition, the helical or cyclone axisymmetric vortex flow is desirably generated in the upstream inside area D. This means that the axisymmetric vortex flow for mixing the slurry and foam can be generated in the area D, even if the contour of the opening 61 is significantly deformed or the center of opening 61 is significantly decentered. However, even if the area Umin extends out of the opening 61, it is preferable that the center axis C is positioned within the opening 61.

FIG. 20 is a partial perspective view showing configurations of the edge portions of the openings 61. The opening 61 shown in FIG. 20(A) has an edge portion 67 in a linear form or shape throughout the entire circumference thereof, and the opening 61 shown in FIG. 20(B) is provided with the inclined surfaces 68, 69, each having a predetermined constant angle of inclination throughout the entire circumference thereof. In the case where the opening 61 has the edge portion 67 in the linear form or shape as shown in FIG. 20(A), the angle of inclination in each of the surfaces 68, 69 varies in accordance with the contour of the opening 61. On the other hand, when each of the inclined surfaces 68, 69 has a predetermined constant angle of inclination, a flat face edge 66 is inevitably formed at least partially in an edge zone of the opening 61. In such a flat face edge 66, a tendency is observed that a stiff mass of gypsum slurry is produced therein and adhered thereto, owing to stagnation and solidification of the slurry. Therefore, from a viewpoint of prevention of the solidified slurry mass adhesion to the opening 61, the opening 61 is preferably provided with the edge portion 67 in the linear form or shape as shown in FIG. 20(A).

Figure 21:
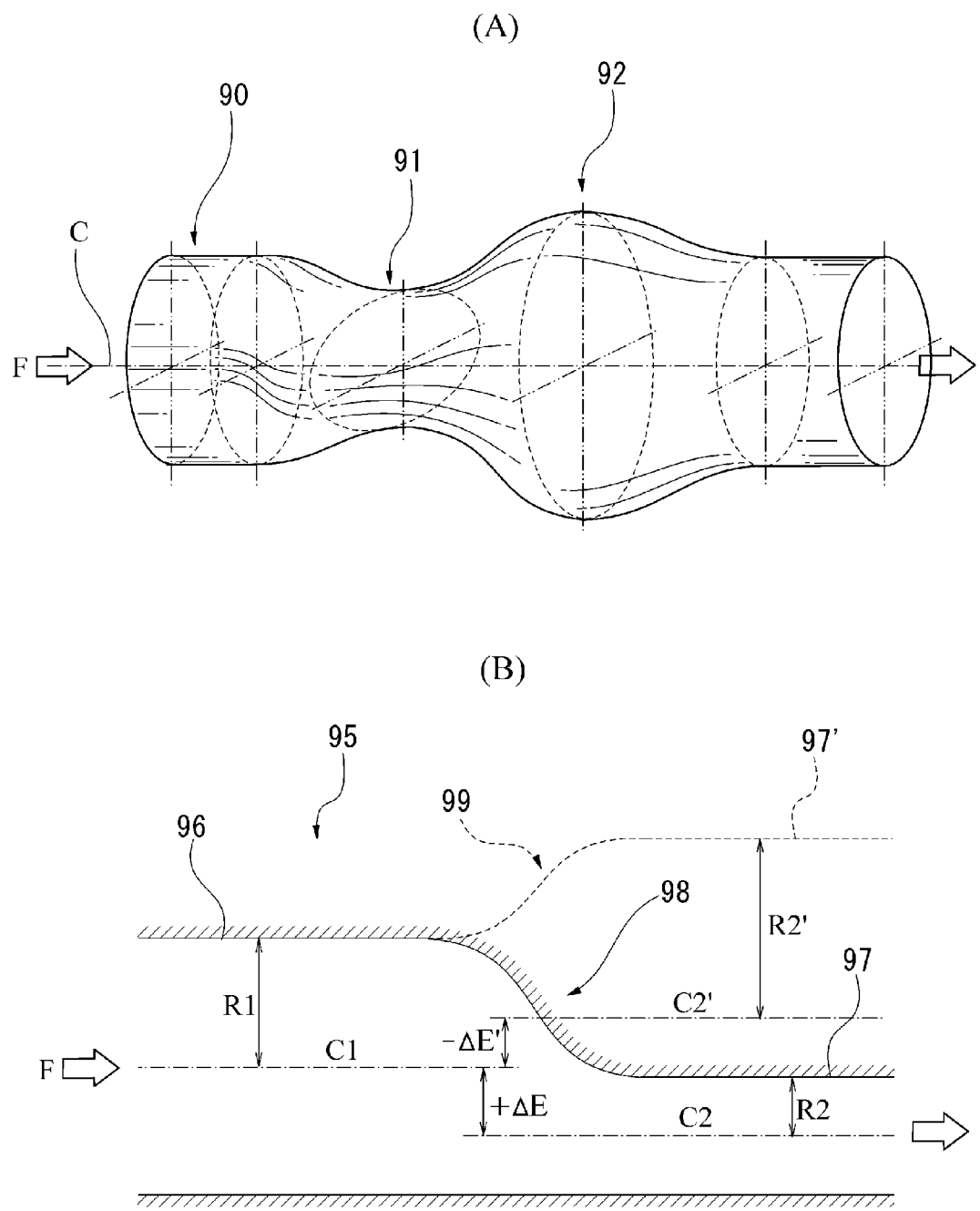
FIG. 21 includes a schematic perspective view and a schematic cross-sectional view illustrating arrangements for varying or deviating a cross-section of a fluid passage, or decentering the fluid passage.

FIG. 21 includes schematic perspective and cross-sectional views showing arrangements for varying the position of the center axis C of the tubular passage by variation or lateralization of the cross-section of the fluid passage.

As set forth above, two methods for delivering the slurry of the mixer 10 without the use of the chute are known in the art, one being a method in which a slurry transporting passage such as the tubular passage 47' as shown in FIG. 5 is transversely connected to a slurry delivery port on the annular wall 23 of the casing 20 so that the slurry is delivered directly onto the lower sheet 1 under the delivery pressure of the mixer 10, and the other being a method in which a slurry delivery passage such as the tubular passage 47" as shown in FIG. 6 is vertically connected to a slurry delivery port of the lower plate 22 of the casing 20 so that the slurry in the mixer 10 is directly discharged on the lower sheet 1 with the effect of gravity. The concept of the present invention is applicable to the tubular passages in those methods, and such arrangements are schematically illustrated in FIG. 21. If desired, a chute similar to the aforementioned chute 50 may be appropriately interposed in the slurry transporting passage or the slurry delivery passage.

A tubular passage 90 as shown in FIG. 21(A) generally has a cross-section in a form of perfect circle, but the passage 90 is locally provided with fluid passage portions 91, 92, each having a non-axisymmetric cross section with respect to the center axis C of the passage 90. Each of the passage portions 91, 92 shown in FIG. 21(A) has an elliptical cross-section which has a major axis directed vertically or horizontally. The axisymmetric vortex flow F produced as an intratubular swirling flow is at least partially broken down, so that the swirling flow on the downstream side of the passage portion 91, 92 does not recover its condition on the upstream side of the passage portions 91, 92, or a swirling flow is not apt to be regenerated on the downstream side of the passage portion 91, 92.

The tubular passage 95 as shown in FIG. 21(B) includes tubular passage portions 96, 97, each having a perfect circular cross-section. The radius R1 of the passage portion 96 differs from the radius R2 of the passage portion 97. The passage portion 97 having a relatively small radius is lateralized to one side (the lower side in FIG. 21(B)) at a connection part (fluid passage portion) 98 between the tubular passage portions 96, 97. Center lines C1, C2 of the tubular passage portions 96, 97 are decentered at the connection part 98 (eccentricity +□E), and therefore, the axisymmetric vortex flow F produced as an intratubular swirling flow is at least partially broken down by such change or lateralization of the fluid passage cross-section. As the result, the flow on the downstream side of this fluid passage portion does not regenerate its condition on the upstream side thereof, or a swirling flow is not apt to occur on the downstream side of the fluid passage portion. Alternatively, a tubular passage portion 97' with a relatively large diameter (radius R2') may be connected to the tubular passage portion 96 at a connection part (fluid passage portion) 99 as shown by dotted lines in FIG. 21(B) so as to decenter center lines C1, C2' of the passage portions 96, 97' (eccentricity −□E') to one side (the upper side in FIG. 21(B)). Further, another tubular passage portion 96 or the like may be connected to a downstream end of the passage portion 97, 97' so as to make a locally or transitionally reduced or enlarged section by the passage portion 97, 97'.

Although the present invention has been described as to preferred embodiments and examples, the present invention is not limited thereto, but may be carried out in any of various modifications or variations without departing from the scope of the invention as defined in the accompanying claims.

For instance, the arrangement of the device according to the present invention can be equally applied to a mixer other than the pin type of mixer, such as a pinless mixer (a vane-type mixer or the like).

Further, the cross section of the intratubular passage of the chute, transporting passage or delivery passage is not limited to a strictly perfect circle, but it may be a circle somewhat having staggering, distortion, local deformation and so forth. If desired, the center axis of the chute may be inclined with respect to the vertical direction, or the chute may be in communication with the mixing area of the mixer by a tube, such as a flexible tube.

Furthermore, the mixer in the aforementioned embodiment has the fractionation port for the slurry having a relatively high specific gravity, but the present invention is applicable to a mixer without the fractionation port or a mixer which feeds the slurry having a relatively low specific gravity through the fractionation port.

Further, the mixer in the aforementioned embodiment is arranged to feed the foam to the slurry in the hollow connector part, but the foam may be fed to the slurry in the chute or the mixing area. In addition, the mixer in the aforementioned embodiment is so arranged that the foam produced by a foaming action of the foaming agent in the foam production means is fed to the slurry, but the foaming agent may be directly fed to the slurry so that the foam is produced in the slurry by its foaming action in the slurry. If desired, the revolving direction of slurry in the chute may be set to be the direction opposite to the direction shown in FIG. 5 by change of the positional relation between the hollow connector part and the chute.

Furthermore, the opening of the orifice member defining the orifice passage is positioned horizontally for changing or lateralizing the cross section of the fluid passage in the aforementioned embodiment. However, the opening may be changed or lateralized by tilting the opening generally or partially, or the angle of inclination of the opening may be variably changed with respect to the horizontal plane for change or lateralization of the cross section of the fluid passage, thereby changing the position of the center axis of the tubular passage. In a case where the cross section is changed or lateralized by such change of the angle, changeable setting of the inclination angle through at least 3 degrees is required.

INDUSTRIAL APPLICABILITY

The present invention can be applied to a mixing and stirring device, a mixing and stirring method, and a method for manufacturing lightweight gypsum board. According to the present invention, the turning motion of gypsum slurry spouting onto the sheet of paper for a gypsum board liner can be restricted, whereby the maldistribution, deviation or irregular dispersion can be prevented from occurring in the distribution of specific gravity of the slurry on the sheet of paper.

The present invention is very effective in production of lightweight gypsum boards having the specific gravity of 0.4-0.7 since the density distribution of the gypsum core can be made uniform. Therefore, taking into consideration the tendency of reduction in weight of gypsum boards in recent years, the advantages of the present invention are remarkable in practice.

LIST OF REFERENCE NUMERALS 1 lower sheet of paper
2 upper sheet of paper
3 slurry
4 slurry delivery section
5 continuous three-layered belt-like formation
7 slurry discharge pipe
8 conduits for fractionation
10 mixer
20 casing (housing)
23 annular wall
40 foam feeding conduit
41 foam feeding port
45 slurry outlet port
46 slurry fluid passage
47 hollow connector part
50 chute
51 cylindrical body
54 opening
55 upper opening
56, 58 bolt
57, 65 bolt hole
60 orifice member
61 opening (orifice passage)
62 outer circumferential surface
63 circular edge
68, 69 inclined surface
70, 80 slurry discharge port
90, 95 tubular passage
91, 92 fluid passage portion
96, 97, 97' tubular passage portion
98, 99 connection part (fluid passage portion)
C center axis
D intratubular area inside of chute (upstream inside area)
F swirling flow in circular tube
G centroid of orifice passage
H overall height of orifice member
K intratubular area of slurry discharge pipe (downstream inside area)
P Powder materials
L liquid (water)
M foam
r, R radius

The invention claimed is:
1. A mixing and stirring device for gypsum slurry, which has a circular casing forming a mixing area for mixing of the gypsum slurry, a rotary disc positioned in the casing and rotated in a predetermined rotational direction, and a tubular passage for delivery of the gypsum slurry, which is provided outside of the casing in order to feed the slurry of the mixing area onto a sheet of paper for gypsum board liner, and which generates an intratubular swirling flow for mixing the gypsum slurry with foam or foaming agent for adjustment of a specific gravity, wherein said tubular passage includes a chute which receives the gypsum slurry effluent from the casing through a slurry outlet port provided on the casing and which allows the slurry to flow down gravitationally therein, and a discharge pipe portion connected with an outlet part of said chute for spouting the slurry onto said sheet of paper;

wherein said chute has an orifice passage which locally constricts a cross section of an intratubular area of the chute for causing the gypsum slurry and the foam or foaming agent to revolve in the intratubular area; and wherein a centroid of a figure of a cross section of the orifice passage is located at a position eccentric with respect to a center axis of said intratubular area.

2. The device as defined in claim 1, wherein an eccentricity ratio $\eta=\Delta E/r$ of said centroid is set to be equal to or greater than 0.06, and wherein $\Delta E$ is a distance between said centroid and said center axis of the intratubular area, and r is a radius of the intratubular area.

3. The device as defined in claim 1, wherein a contour of the cross section of said orifice passage is a composite figure constituted from a plurality of figures partially superimposed with each other, and the centroid of the composite figure is eccentric with respect to the center axis of said intratubular area.

4. The device as defined in claim 3, wherein said composite figure is constituted from a plurality of circles having different diameters and/or different center positions, the circles being superimposed with each other only partially.

5. The device as defined in claim 1, wherein an eccentricity ratio $\eta'=\Delta E/Rmax$ is set to be equal to or greater than 0.1, and wherein $\Delta E$ is a distance between said centroid and the center axis of said intratubular area, and Rmax is a maximum value of a distance between said center axis and a contour of the figure.

6. The device as defined in claim 1, wherein a foam feeding port, which feeds the foam or foaming agent to said slurry, is located on an annular wall of said casing so as to feed the foam or foaming agent to the slurry immediately before the slurry of said mixing area flows into said slurry outlet port, or is provided on a hollow connector part between the chute and the slurry outlet port so as to feed the foam or foaming agent to the slurry immediately after the slurry of the mixing area flows through the slurry outlet port.

7. The device as defined in claim 1, wherein an orifice member having said orifice passage is positioned in said chute, and the orifice member is supported in the chute rotatably around said center axis of the intratubular area for adjusting or controlling an intensity of an axisymmetric vortex flow breakdown action of the orifice passage.

8. An apparatus for manufacturing lightweight gypsum boards, which has the mixing and stirring device as defined in claim 1.

9. A method for mixing and stirring gypsum slurry, with use of a mixing and stirring device for the gypsum slurry having a circular casing forming a mixing area for mixing of the gypsum slurry, a rotary disc positioned in the casing and rotated in a predetermined rotational direction, and a chute for delivery of the gypsum slurry which is provided outside of the casing in order to feed the slurry of the mixing area to a sheet of paper for gypsum board liner and which generates an intratubular swirling flow for mixing the slurry with foam or foaming agent for adjustment of specific gravity, wherein the slurry effluent from the casing through a slurry outlet port positioned on said casing is caused to flow down gravitationally in an intratubular area of the chute, and the foam or foaming agent is mixed with the slurry by said intratubular swirling flow generated in the intratubular area, and the slurry is introduced from the chute into a discharge pipe portion through an orifice passage which locally constricts a cross section of the intratubular area, and wherein a centroid of a figure of a cross section of the orifice passage is located at a position eccentric with respect to a center axis of said intratubular area, so that an axisymmetric vortex flow in the intratubular area is at least partially broken down by the orifice passage, for restricting regeneration or generation of the intratubular swirling flow in said discharge pipe portion on a downstream side of the orifice passage.

10. The method as defined in claim 9, wherein an eccentricity ratio $\eta=\Delta E/r$ of said centroid is set to be equal to or greater than 0.06, and wherein $\Delta E$ is a distance between the centroid and said center axis, and r is a radius of said intratubular area.

11. The method as defined in claim 9, wherein a contour of the cross section of said orifice passage is a composite figure constituted from a plurality of figures partially superimposed with each other, and the centroid of the composite figure is eccentric with respect to the center axis of said intratubular area.

12. The method as defined in claim 11, wherein said composite figure is constituted from a plurality of circles having different diameters and/or different center positions, the circles being superimposed with each other only partially.

13. The method as defined in claim 9, wherein an eccentricity ratio $\eta'=\Delta E/Rmax$ is set to be equal to or greater than 0.1, and wherein $\Delta E$ is a distance between said centroid and the center axis of said intratubular area, and Rmax is a maximum value of a distance between said center axis and a contour of the figure.

14. The method as defined in claim 9, wherein a supply amount of foam or foaming agent fed to said gypsum slurry is set to be the amount for making a gypsum core of the gypsum board having a specific gravity in a range from 0.4 to 0.7.

15. The method as defined in claim 9, wherein intensity of an axisymmetric vortex flow breakdown action of said orifice passage is adjusted or controlled by change or lateralization of a position or configuration of the cross section of said orifice passage.

16. A method for manufacturing lightweight gypsum boards having a specific gravity equal to or less than 0.8, wherein gypsum slurry is produced with use of a mixing and stirring device for the gypsum slurry, which has a circular casing forming a mixing area for mixing of the gypsum slurry, a rotary disc positioned in the casing and rotated in a predetermined rotational direction, and a tubular passage for delivery of the gypsum slurry provided outside of the casing in order to feed the slurry of the mixing area to a sheet of paper for gypsum board liner, and wherein the slurry of the mixing area is spouted onto said sheet of paper through a chute which allows the slurry to flow down gravitationally, comprising steps of:

introducing said gypsum slurry of the mixing area effluent from the casing through a slurry outlet port disposed on the casing, into a tubular passage of said chute together with foam or foaming agent for adjustment of a specific gravity, and generating an intratubular swirling flow in an intratubular area of the chute by turning the slurry therein so that the slurry and the foam or foaming agent are mixed in the tubular passage by the intratubular swirling flow generated in the chute;

introducing said gypsum slurry from the chute into a discharge pipe portion through an orifice passage which locally constricts a cross section of fluid passage of the intratubular area, and positioning a centroid of a figure of the cross section of the orifice passage at a position eccentric with respect to a center axis of said intratubular area for causing an axisymmetric vortex flow in said intratubular area to be at least partially broken down by the orifice passage, thereby restricting regeneration or generation of the intratubular swirling flow in an intratubular area of said discharge pipe portion located on a downstream side of said orifice passage.

17. The method as defined in claim 16, wherein an eccentricity ratio $\eta=\Delta E/r$ of said centroid is set to be equal to or greater than 0.06, and wherein $\Delta E$ is a distance between the centroid and said center axis, and r is a radius of the intratubular area.

18. The method as defined in claim 16, wherein a contour of the cross section of said orifice passage is a composite figure constituted from a plurality of figures partially superimposed with each other, and the centroid of the composite figure is eccentric with respect to the center axis of said intratubular area.

19. The method as defined in claim 16, wherein an eccentricity ratio $\eta'=\Delta E/Rmax$ is set to be equal to or greater than 0.1, and wherein $\Delta E$ is a distance between said centroid and the center axis of said intratubular area, and Rmax is a maximum value of a distance between said center axis and a contour of the figure.

20. The method as defined in claim 16, wherein a supply amount of foam or foaming agent fed to said gypsum slurry is set to be the amount for making a gypsum core of the gypsum board having a specific gravity in a range from 0.4 to 0.7.

21. The method as defined in claim 16, wherein said mixing and stirring device has an orifice member provided with said orifice passage, and the orifice member is supported in the chute rotatably around said center axis of the intratubular area so that a position or configuration of the orifice passage with respect to said chute is varied by rotation of the orifice member, so as to adjust or control an axisymmetric vortex flow breakdown action of the orifice passage, and intensity of said action is adjusted or controlled by the rotation of the orifice member during operation of said device, in relation with condition or physical property of the gypsum slurry fed to the sheet of paper.

22. The method as defined in claim 16, wherein said foam or foaming agent is fed to the slurry immediately before or after the slurry of the mixing area flows through the slurry outlet port.

23. A method for manufacturing lightweight gypsum boards, wherein the gypsum boards having a specific gravity in a range from 0.4 to 0.7 are produced with use of the method as defined in claim 16.

* * * * *

UNITED STATES PATENT AND TRADEMARK OFFICE
CERTIFICATE OF CORRECTION

PATENT NO. : 9,856,168 B2
APPLICATION NO. : 14/647230
DATED : January 2, 2018
INVENTOR(S) : Yasutoshi Ueno et al.

Page 1 of 1

It is certified that error appears in the above-identified patent and that said Letters Patent is hereby corrected as shown below:

On the Title Page

Item [54] (Title), Line 3:
Delete "MANUFACTURING" and insert -- MANUFACTURING, --, therefore.
Line 4:
After "MANUFACTURING" delete "LIGHTWEIGHT GYPSUM BOARD,".

In the Specification

Column 1, Line 2:
Delete "MANUFACTURING" and insert -- MANUFACTURING, --, therefore.
Line 3:
After "MANUFACTURING" delete "LIGHTWEIGHT GYPSUM BOARD,".

Signed and Sealed this
Twenty-seventh Day of March, 2018

Andrei Iancu
*Director of the United States Patent and Trademark Office*